US 9,559,576 B2

(12) United States Patent
Albertson

(10) Patent No.: US 9,559,576 B2
(45) Date of Patent: Jan. 31, 2017

(54) MAGNET POWER TRANSMISSION

(71) Applicant: Robert V. Albertson, Alma, WI (US)

(72) Inventor: Robert V. Albertson, Alma, WI (US)

(73) Assignee: MAG-TRANS CORPORATION, Alma, WI (US)

( * ) Notice: Subject to any disclaimer, the term of this patent is extended or adjusted under 35 U.S.C. 154(b) by 325 days.

(21) Appl. No.: 14/158,554

(22) Filed: Jan. 17, 2014

(65) Prior Publication Data
US 2015/0207394 A1 Jul. 23, 2015

Related U.S. Application Data

(62) Division of application No. 13/066,662, filed on Apr. 19, 2011.

(60) Provisional application No. 61/342,744, filed on Apr. 19, 2010.

(51) Int. Cl.
| | | |
|---|---|---|
| H02K 49/00 | (2006.01) | |
| H02K 49/04 | (2006.01) | |
| H02K 49/10 | (2006.01) | |
| H02K 7/00 | (2006.01) | |
| B60L 11/18 | (2006.01) | |
| B60L 15/20 | (2006.01) | |

(52) U.S. Cl.
CPC ......... *H02K 49/046* (2013.01); *B60L 11/1805* (2013.01); *B60L 11/1864* (2013.01); *B60L 15/2054* (2013.01); *H02K 7/006* (2013.01); *H02K 49/108* (2013.01); *B60L 2200/36* (2013.01); *B60L 2240/12* (2013.01); *B60L 2240/421* (2013.01); *B60L 2240/423* (2013.01); *B60L 2240/486* (2013.01); *B60L 2250/26* (2013.01); *B60L 2270/145* (2013.01); *H02K 2201/03* (2013.01); *H02K 2213/09* (2013.01); *Y02T 10/641* (2013.01); *Y02T 10/645* (2013.01); *Y02T 10/7005* (2013.01); *Y02T 10/7061* (2013.01); *Y02T 10/72* (2013.01); *Y02T 10/7275* (2013.01)

(58) Field of Classification Search
CPC ..... H02K 9/1084; H02K 21/24; H02K 49/108
USPC .......................... 310/103, 105, 156.32, 90.5
See application file for complete search history.

(56) References Cited

U.S. PATENT DOCUMENTS

| | | | | |
|---|---|---|---|---|
| 3,121,814 A | * | 2/1964 | Kober | ................. H02K 1/2793 310/156.32 |
| 3,382,385 A | * | 5/1968 | Henry-Baudot | ....... H02K 49/02 310/105 |
| 3,579,003 A | * | 5/1971 | Gray | .................... H02K 49/108 310/93 |

(Continued)

FOREIGN PATENT DOCUMENTS

JP 2-311161 * 12/1990 ............. H02K 49/10

*Primary Examiner* — Burton Mullins
(74) *Attorney, Agent, or Firm* — Richard O. Bartz

(57) ABSTRACT

A motor vehicle having an electric motor driving a permanent magnet power transmission connected to the gear box of the vehicle. The magnet power transmission has first and second disk assemblies. A copper member on the first disk assembly faces a plurality of permanent magnets located in bores in the second disk assembly. A control assembly operatively connected to the second disk assembly selectively moves the second disk assembly and magnets toward and away from the first disk assembly to vary the flux between the first disk assembly and second disk assembly.

10 Claims, 23 Drawing Sheets

(56) References Cited

U.S. PATENT DOCUMENTS

| | | | | |
|---|---|---|---|---|
| 4,601,439 A * | 7/1986 | Moosberg | ........ | A01K 89/01555 |
| | | | | 242/288 |
| 4,761,590 A * | 8/1988 | Kaszman | ............... | H02K 29/10 |
| | | | | 310/156.35 |
| 4,826,150 A * | 5/1989 | Minoura | ............ | A63B 21/0051 |
| | | | | 310/103 |
| 5,611,368 A * | 3/1997 | Hwang | .................... | F16J 15/50 |
| | | | | 137/553 |
| 5,668,424 A | 9/1997 | Lamb | | |
| 5,834,872 A | 11/1998 | Lamb | | |
| 6,054,788 A | 4/2000 | Dombrovski et al. | | |
| 6,682,430 B2 * | 1/2004 | Killen | .................. | H02K 49/046 |
| | | | | 192/84.5 |
| 6,850,019 B2 | 2/2005 | Gerfast | | |
| 7,453,177 B2 * | 11/2008 | Highfill | ................ | H02K 49/108 |
| | | | | 310/103 |
| D614,216 S | 4/2010 | Albertson | | |
| 2005/0099081 A1 * | 5/2005 | Obidniak | ............... | H02K 21/24 |
| | | | | 310/156.36 |
| 2008/0203831 A1 * | 8/2008 | French | .................. | H02K 49/102 |
| | | | | 310/46 |
| 2010/0052834 A1 * | 3/2010 | Feng | .................. | F04C 29/0064 |
| | | | | 335/306 |

* cited by examiner

MAGNET POWER TRANSMISSION

CROSS REFERENCE TO RELATED APPLICATION

This application is a division of U.S. application Ser. No. 13/066,662 filed Apr. 19, 2011. U.S. application Ser. No. 13/066,662 claims the priority of U.S. Application Ser. No. 61/342,744 filed Apr. 19, 2010.

FIELD OF THE INVENTION

The invention relates to motor vehicles with electric motors and magnet power transmissions connecting the electric motors to the automatic or manual transmissions of the vehicles.

BACKGROUND OF THE INVENTION

Electric motors have been used to operate motor vehicles. The electric motors are connected to conventional power transmissions and clutch units to operate motor vehicles. Permanent magnet couplings have been utilized to apply a load on a motor after the motor is at full speed.

K. J. Lamb in U.S. Pat. No. 5,668,424 discloses a magnetic coupler having a magnetic disk supporting permanent magnets located adjacent an electroconductive plate. The magnetic disk is free to rotate as an independent idler. An electro conductive plate mounted on a spline is moved relative to the magnetic disk to control the air gap and magnetic flux between the magnetic disk and the electroconductive plate to provide speed adjustment of the load while the motor operates at constant speed.

V. Dombrovski et al in U.S. Pat. No. 6,054,788 discloses a magnetic power transmission having first and second shafts drivably connected with a plurality of first and second permanent magnets. The magnets have alternating polarity magnetic surfaces. The first and second magnets are separated by an air gap so that rotation of one of the magnets urges synchronous rotation of the other magnets.

SUMMARY OF THE INVENTION

The invention comprises an electric motor for a motor vehicle combined with a permanent magnet power transmission that controls the speed of the motor vehicle. The magnet power transmission has a first disk assembly having a copper plate located adjacent a second disk assembly having a plurality of permanent magnets. The first disk assembly is drivably connected to the electric motor which rotates the first disk assembly. The second disk assembly is movably mounted on a shaft to alter the air gap between the copper plate and second disk assembly to change magnetic driving force between the copper plate and the permanent magnets. Controls operated by the vehicle driver regulate the speed of the electric motor and the relative position of the second disk assembly to the copper plate.

DESCRIPTION OF THE INVENTION

Figure 1:
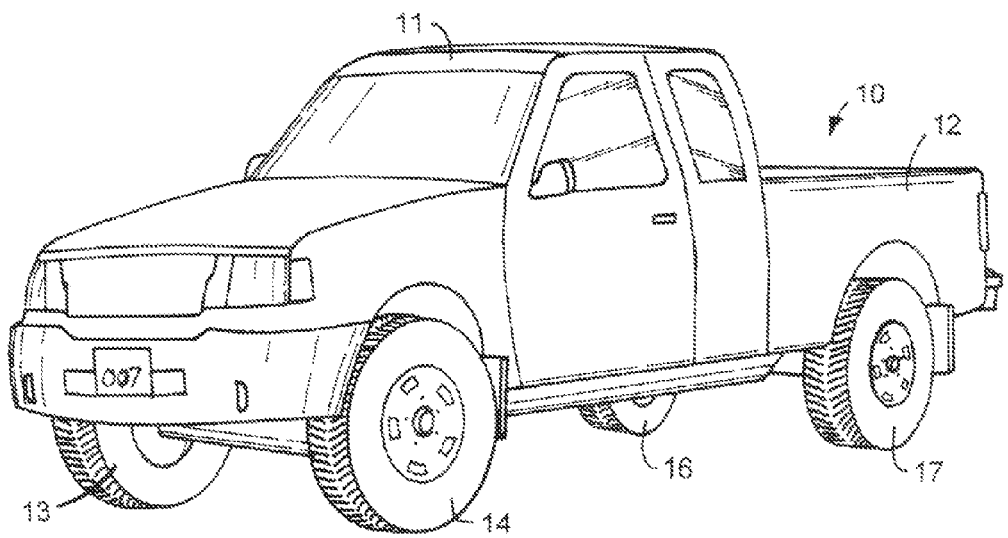
FIG. 1 is a perspective view of a motor vehicle equipped with the electric motor and magnet power transmission of the invention.
Figure 2:
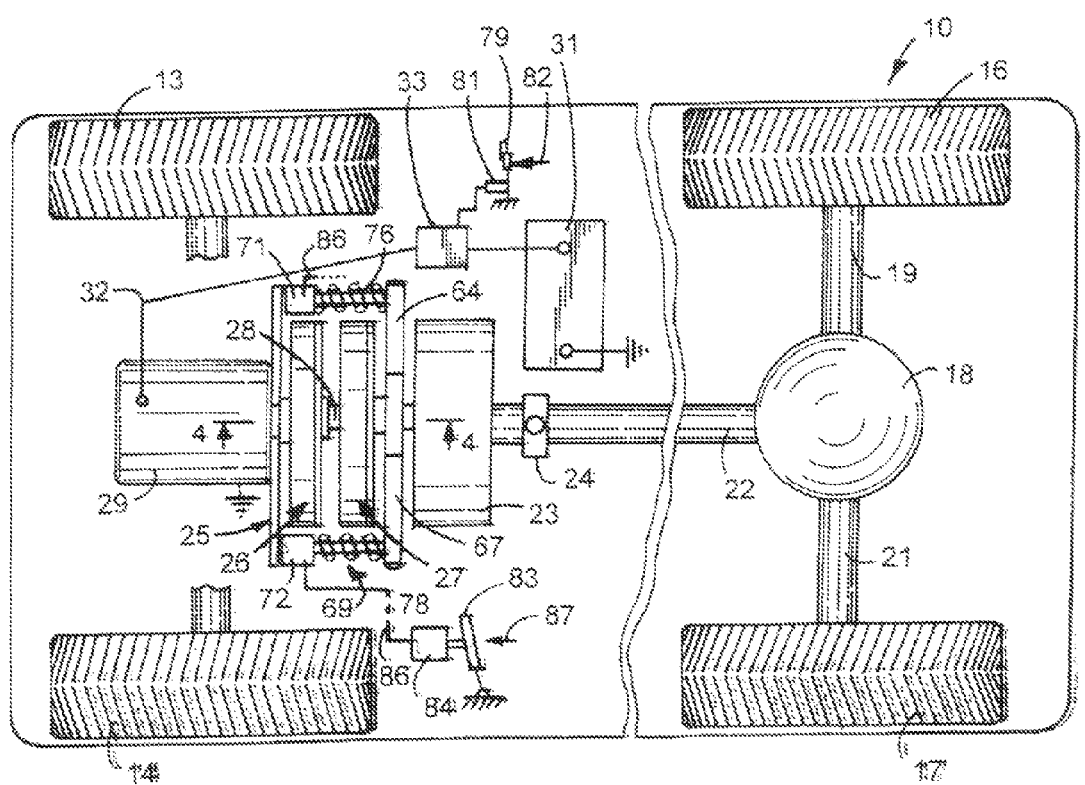
FIG. 2 is a foreshortened diagram of the motor vehicle and electric motor and magnet power transmission of FIG. 1.

The electric power system of the invention is incorporated into a motor vehicle 10, shown in FIG. 1 as a pickup truck. An example of the truck is a Ford Ranger® manufactured by the Ford Motor Company in St. Paul, Minn. Other types of pickup trucks, automobiles, motor homes and motor vehicles can be equipped with the electric power system of the invention. Motor vehicle 10 has an extended cab 11 for accommodating the vehicle operator and passengers. A box 12 for cargo is located behind the cab. Front wheels 13 and 14 and rear drive wheels 16 and 17 support vehicle 10 on a surface of a road. As shown in FIG. 2, rear wheels 16 and 17 are drivably connected to a differential 18 with axles 19 and 21. A drive shaft 22 is coupled to a five-speed manual transmission with overdrive 23. A universal joint 24 connects drive shaft 22 with transmission 23. The transmission can be an automatic transmission with overdrive.

Figure 3:
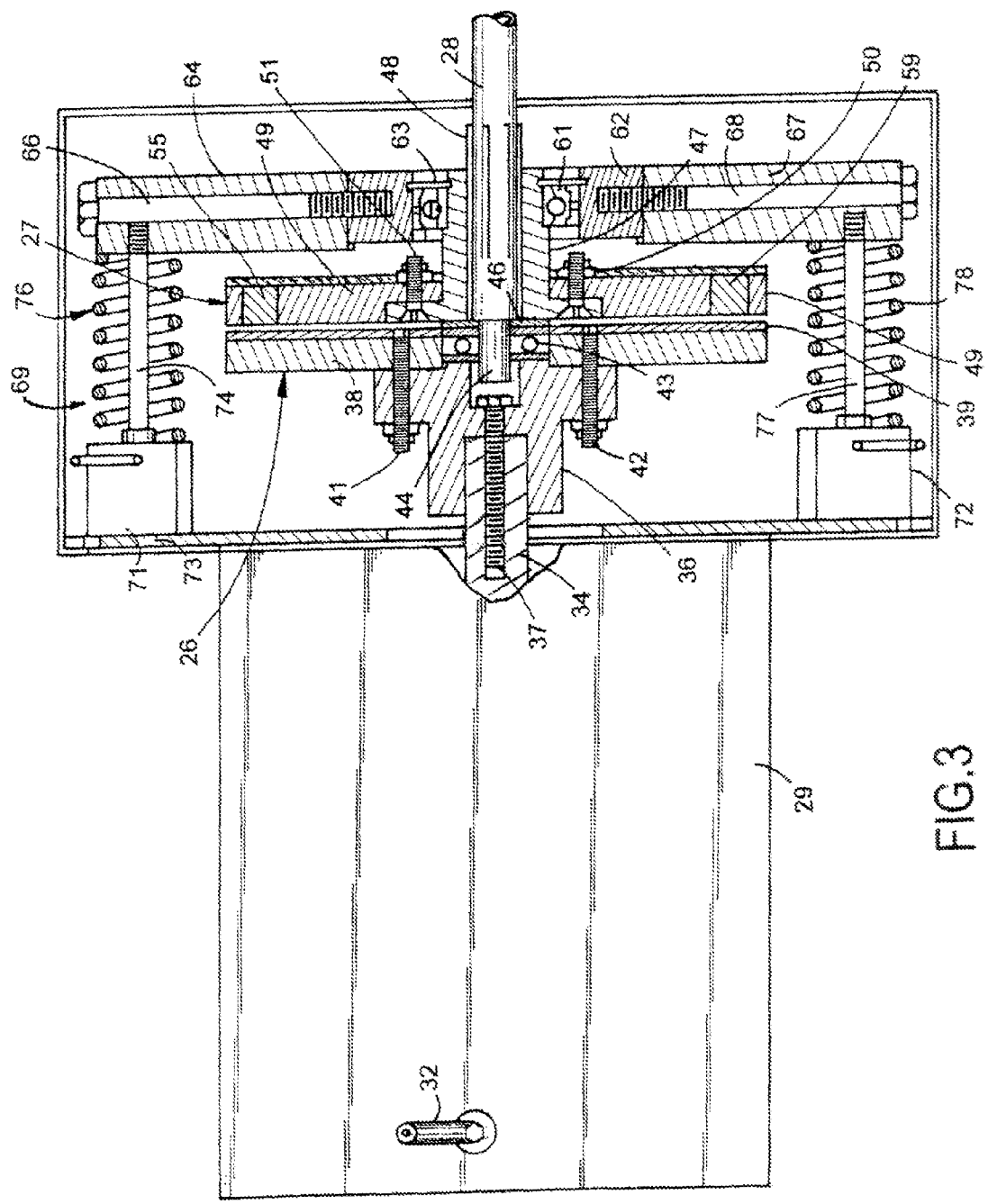
FIG. 3 is an enlarged top plan view, partly sectioned, of the electric motor and magnet power transmission of FIG. 2.
Figure 4:
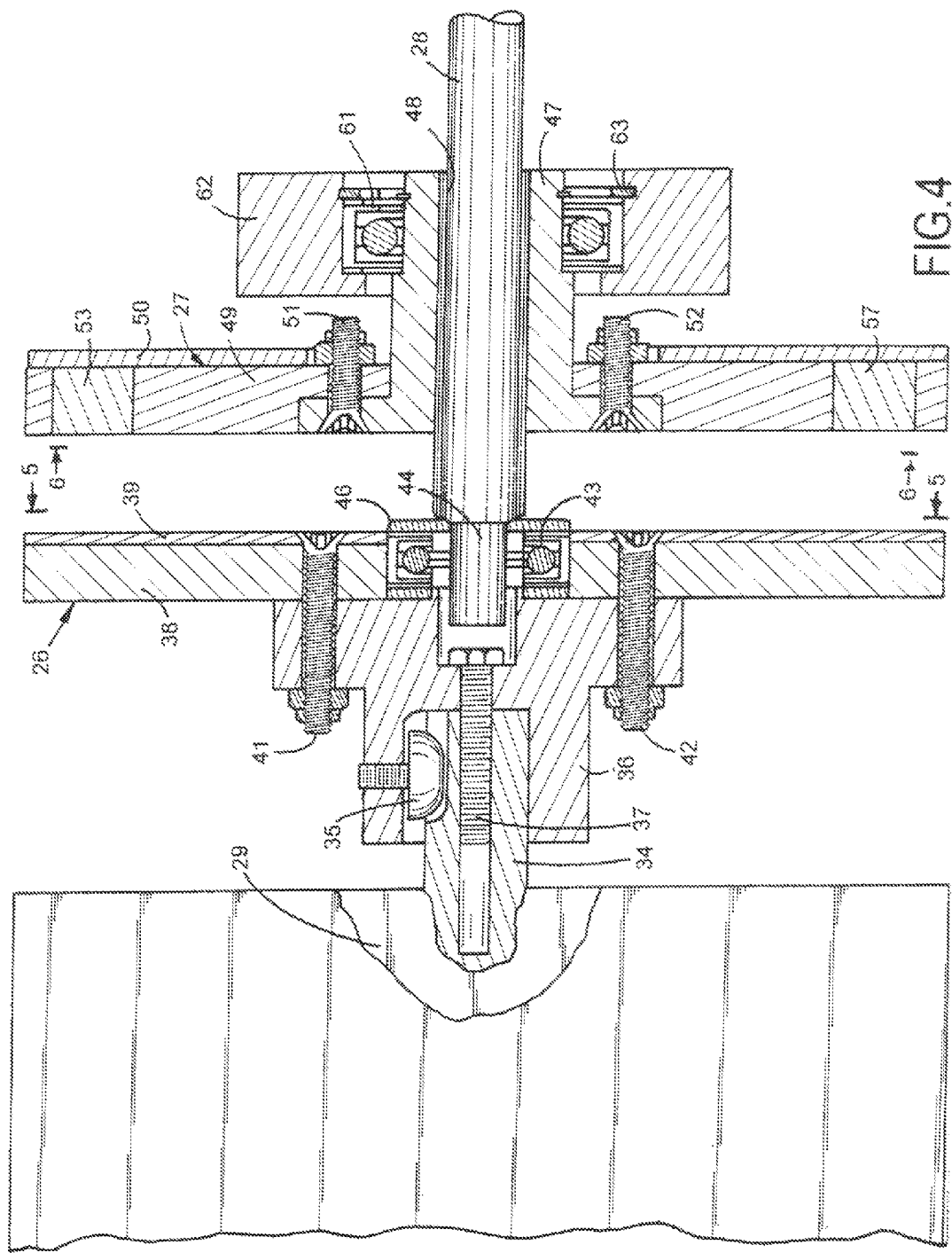
FIG. 4 is an enlarged sectional view taken along line 4-4 of FIG. 2.

A magnet power transmission or drive apparatus 25 operatively couples an electric motor 29 to the vehicle automotive transmission 23. Electric motor 29 is a 100 horsepower d.c. electric motor. An example of electric motor 29 is a single coil direct current permanent magnet electric motor disclosed by S. R. Gerfast in U.S. Pat. No. 6,850,019. Other types of electric motors can be used to provide power to transmission 23. As shown in FIGS. 3 and 4, magnetic drive apparatus 25 has a first disk assembly 26 mounted on motor drive shaft 34 of electric motor 29. A second disk assembly 27 having permanent magnets 53-60 located adjacent disk assembly 26 is drivably coupled to the power input shaft 28 of transmission 23. Electric motor 29 rotates disk assembly 26 relative to disk assembly 27 whereby the magnetic flux or coupling between disk assemblies 26 and 27 transmits rotational power or torque to transmission 23. Returning to FIG. 2, electric motor 29 is wired to one or more batteries or electric power source 31 with a cable 32. A controller 33 regulates the electric power directed to electric motor 29 to control the power and speed of motor 29.

As shown in FIGS. 3 and 4, electric motor 29 has a drive shaft 34 supporting a hub. A key 35 mounted on hub 36 extends into a groove in shaft 34 to drivably connect hub 36 to shaft 34. A bolt 37 axially connects hub 36 to shaft 34. Other structures can be used to mount hub 36 on shaft 34.

Figure 5:
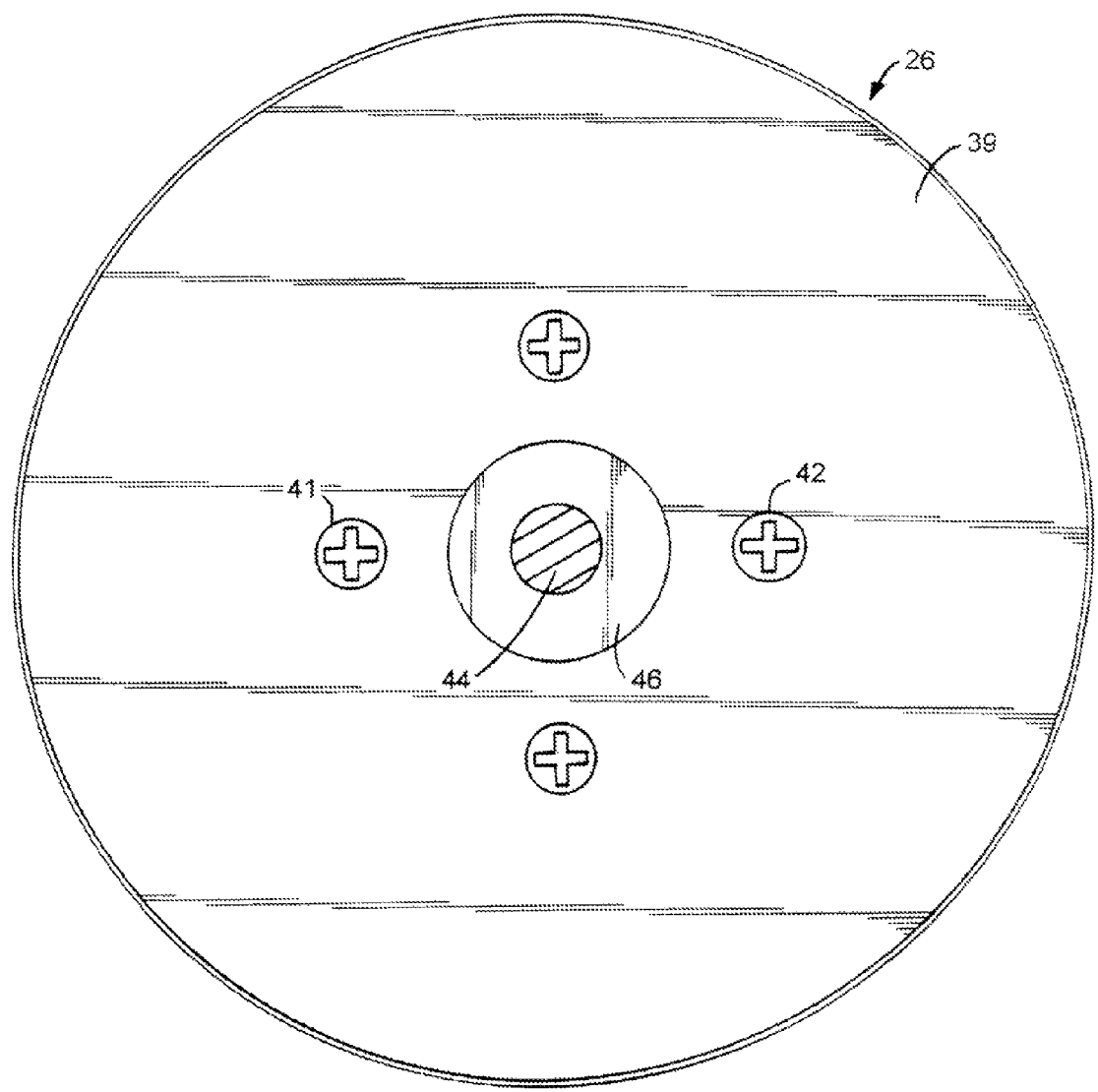
FIG. 5 is a sectional view taken along line 5-5 of FIG. 4.

First disk assembly 26 has an annular body 38 secured to hub 36 with nut and bolt assemblies 41 and 42. As shown in FIG. 5, body 38 is a flat annular member of ferrous material, such as steel. A copper plate 39 covers the outside face of body 38. Nut and bolt assemblies 41 and 42 retain plate 39 on body 38. Electric motor 29 rotates body 38 and copper plate 39.

The transmission power input shaft 28, as shown in FIGS. 3 and 4, has a cylindrical end or boss 44 extended into a recess in hub 36. A thrust bearing 43 supports boss 44 on body 38. Bearing 43 is located in a central bore in body 38. Bearing 43 mounted on body 38 and boss 44 maintains shaft 28 axially aligned with electric motor shaft 34 and prevents radial shifting and tilting of disk assembly 27 relative to disk assembly 26. A spacer member or disk 46 surrounding boss 44 prevents hub 47 and body 49 from engaging copper plate 39.

Figure 6:
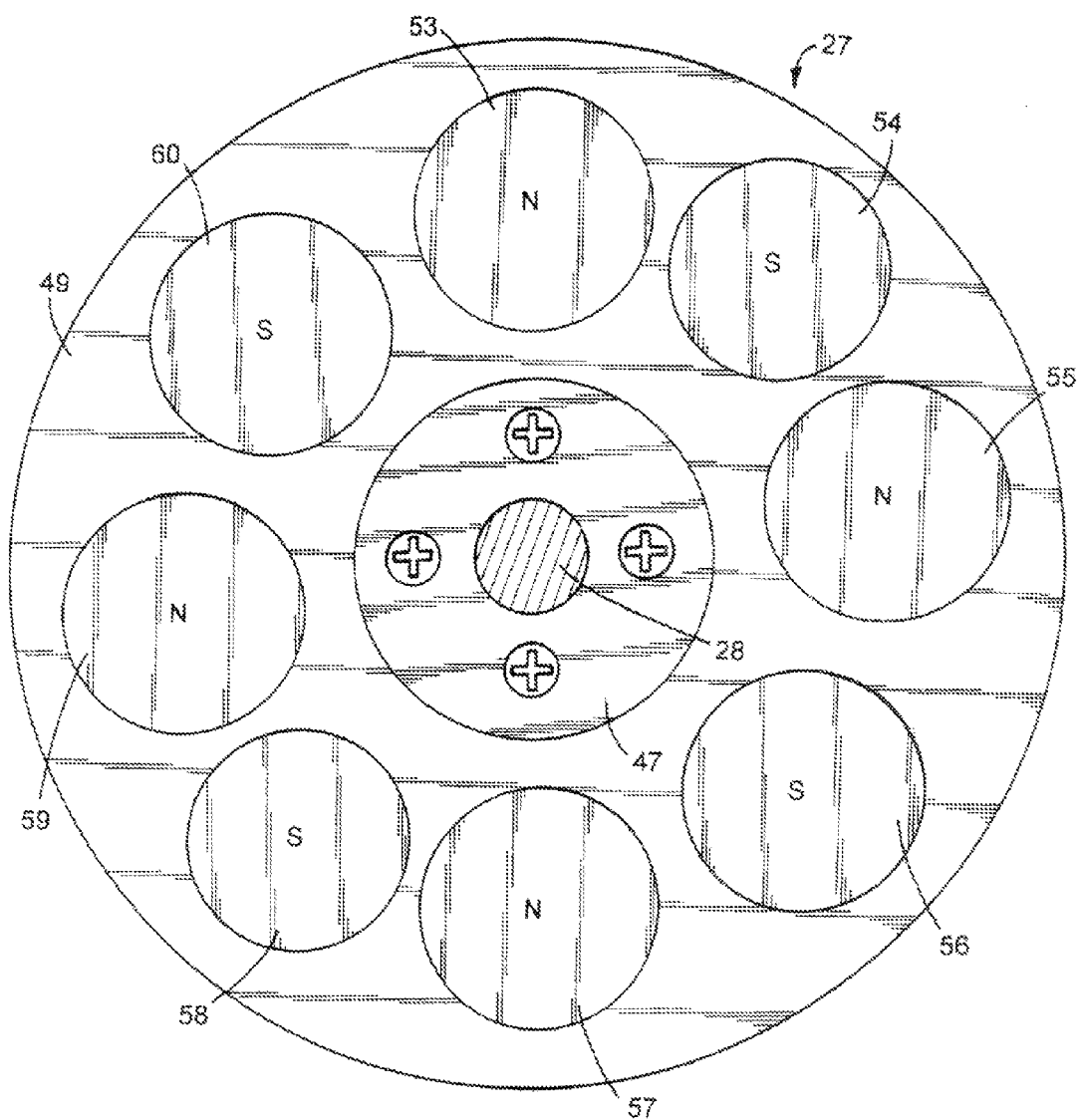
FIG. 6 is a sectional view taken along line 6-6 of FIG. 4.
Figure 7:
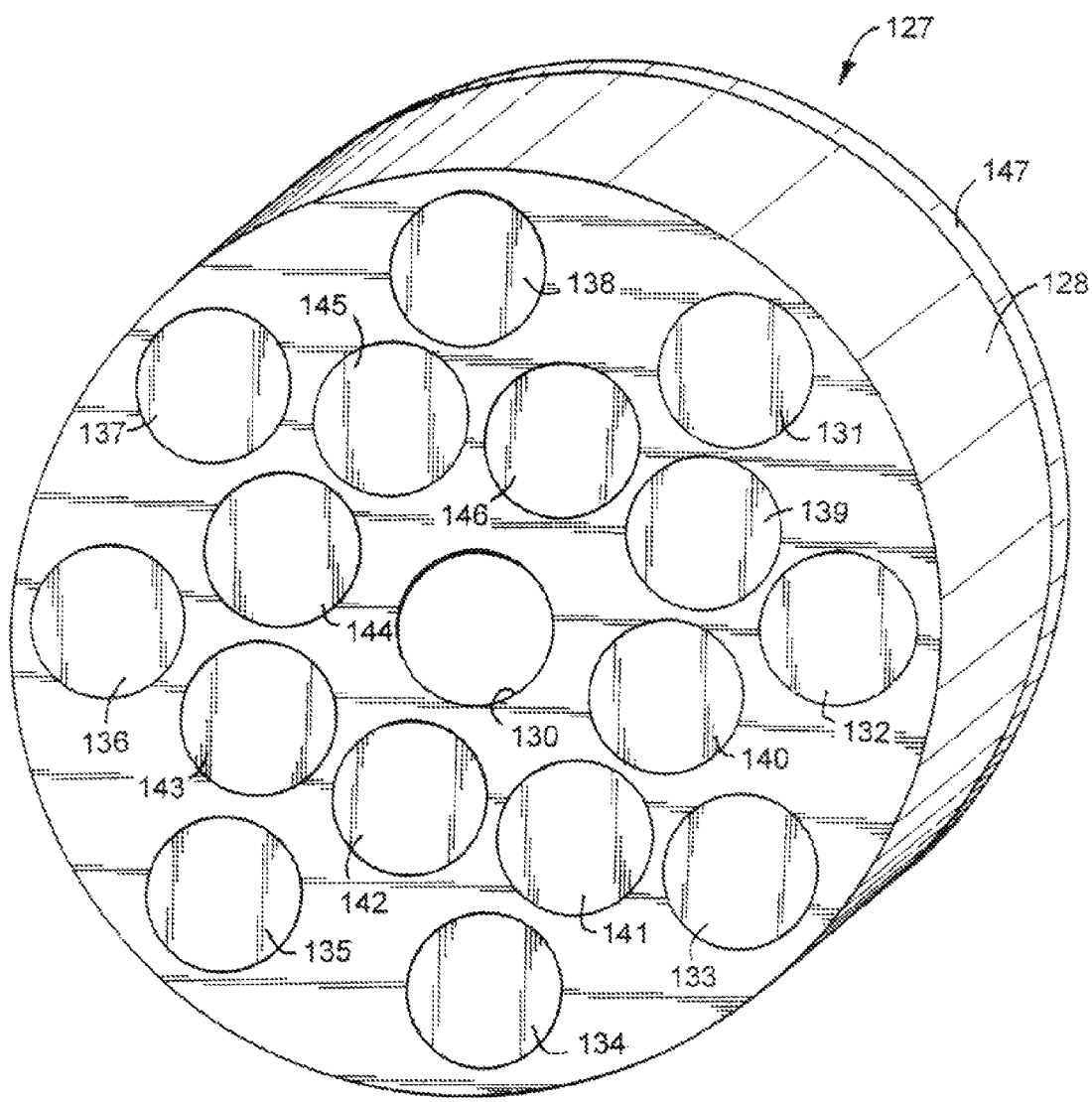
FIG. 7 is a perspective view of another embodiment of the magnet disk assembly for the magnet power transmission of the invention.
Figure 8:
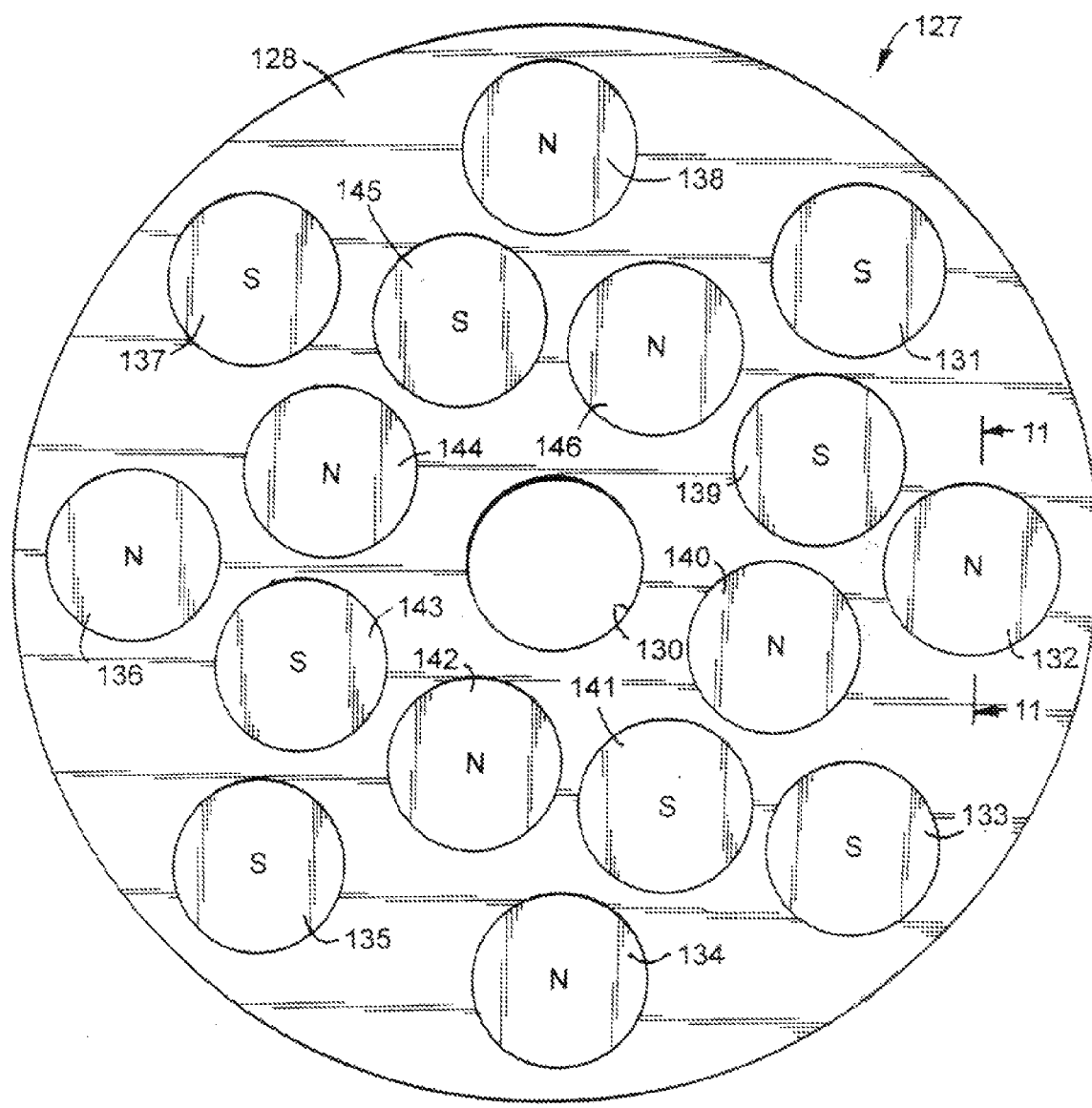
FIG. 8 is a front elevational view of FIG. 7.
Figure 9:
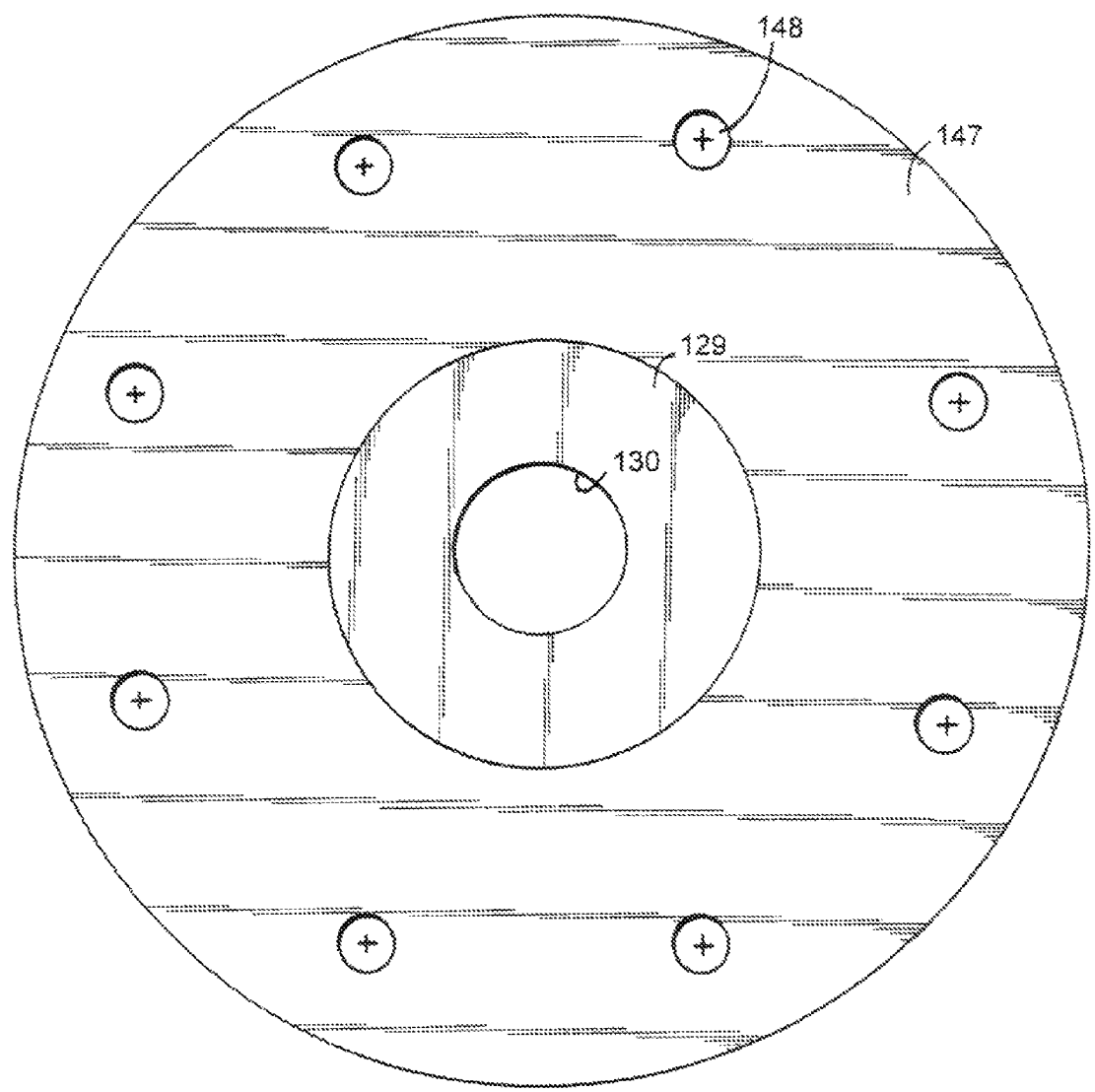
FIG. 9 is a rear elevational view of FIG. 7.
Figure 10:
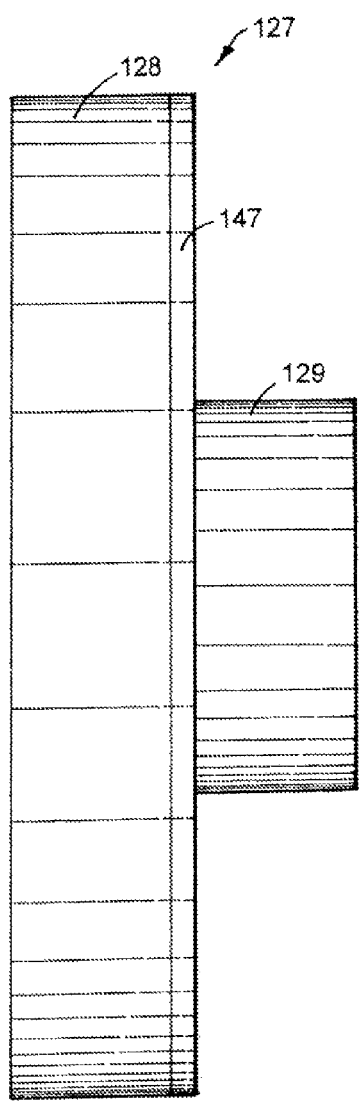
FIG. 10 is a side elevational view of the right side of FIG. 7.

Second disk assembly 27 comprises a cylindrical body 49 connected to a hub 47 with nut and bolt assemblies 51 and 52. Shaft 28 and hub 47 have cooperating axial splines 48 that allow hub 47 along with body 49 to axially slide on shaft 48 as shown in FIGS. 3 and 4. An annular plate or member 50 attached to the outside face of body 49 covers the outer ends of magnets 53 to 60. As shown in FIG. 6, a ring of a plurality of permanent magnets 53-60 are located in circumferentially spaced bores or holes in body 49. Magnets 53-60 are cylindrical neodymium magnets having uniform outer cylindrical walls located in firm surface engagement with the inside cylindrical walls of the bores in body 49. Magnets 53-60 can be coated with nickel to inhibit corrosion and strengthen the magnet material. An example of a permanent magnet is described by T. Tayu et al U.S. Pat. No. 7,147,686. Other types of permanent magnets can be mounted on body 49. Adjacent magnets have alternate or opposite North South polarities. The number, size and types of magnets used with body 49 can vary. Also, an additional circular arrangement of magnets can be added to body 49. Plate 50 attached to body 49 covers the outer ends of magnets 53-60. Body 49 and plate 50 are non-magnetic members, such as aluminum, plastic or ceramic. Hub 47 is a high strength member, such as steel. Other materials, including plastics, can be used for fabricating hub 47.

Returning to FIG. 3, a bearing 61 mounted on the outer end portion of hub 47 is surrounded with a collar 62. A snap ring 63 retains bearing 61 on collar 62. A pair of radial arms 64 and 67 are attached to opposite sides of collar 62 with bolts 66 and 68. An actuator or control assembly 69 operably connected to arms 64 and 67 operates to move disk assembly 27 between drive and nondrive positions shown in FIGS. 3 and 4. Actuator 69 has a pair of hydraulic fluid operated piston and cylinder units 71 and 72 mounted on a stationary housing 73. Rods 74 and 77 connect piston and cylinder units 71 and 72 to the outer ends of arms 64 and 67. Piston and cylinder units 71 and 72 when subjected to hydraulic fluid under pressure move second disk assembly 27 toward first disk assembly 26 to effect a magnetic coupling or drive between disk assembly 27 and disk assembly 26. A pair of coil springs 76 and 78 located between arms 64 and 67 and piston and cylinder units 71 and 72 bias second disk assembly 27 away from disk assembly 26 when the hydraulic fluid pressure supplied to piston and cylinder units 71 and 72 is released. Second disk assembly 27 is moved by springs 76 and 78 to a nondrive position as shown in FIG. 4. Electric motor operated linear actuators can be used in lieu of piston and cylinder units 71 and 72 to move disk assembly 27 between drive and nondrive positions. A single hydraulic piston and cylinder assembly can engage collar 62 to move disk assembly 27.

As shown in FIG. 2, a foot pedal 83 operably connected to a hydraulic fluid pump 84 for generating hydraulic fluid under pressure which is directed through tubes or hoses 86 to the piston and cylinder units 71 and 72. Foot pedal 83 is depressed, shown by arrow 87, to maintain operation of pump 84. Cruise control systems can be associated with pump 84 to maintain disk assembly 27 in its driving relationship with disk assembly 26.

A second foot pedal 79 functions as an electric motor control to regulate the operating speed of motor 29. Pedal 79 is coupled to a controller, such as a potentiometer 81 operable to regulate the electric power supplied by control 33 to motor 29 to control the speed of motor 29. Pedal 79 is depressed, as shown by arrow 82, to start electric motor 29 with the magnet transmission in a nondrive condition. Electric motor 29 starts up under no load which reduces the electric energy needed to commence operation of electric motor 29. The operating speed of electric motor 29 increases in response to the depressed position of foot pedal 79. The increased operating speed of motor 29 is directly related to the speed of motor vehicle 10. When foot pedal 79 is released electric motor 29 is shut off terminating power to magnetic power transmission 25 and motor vehicle 10.

Figure 11:
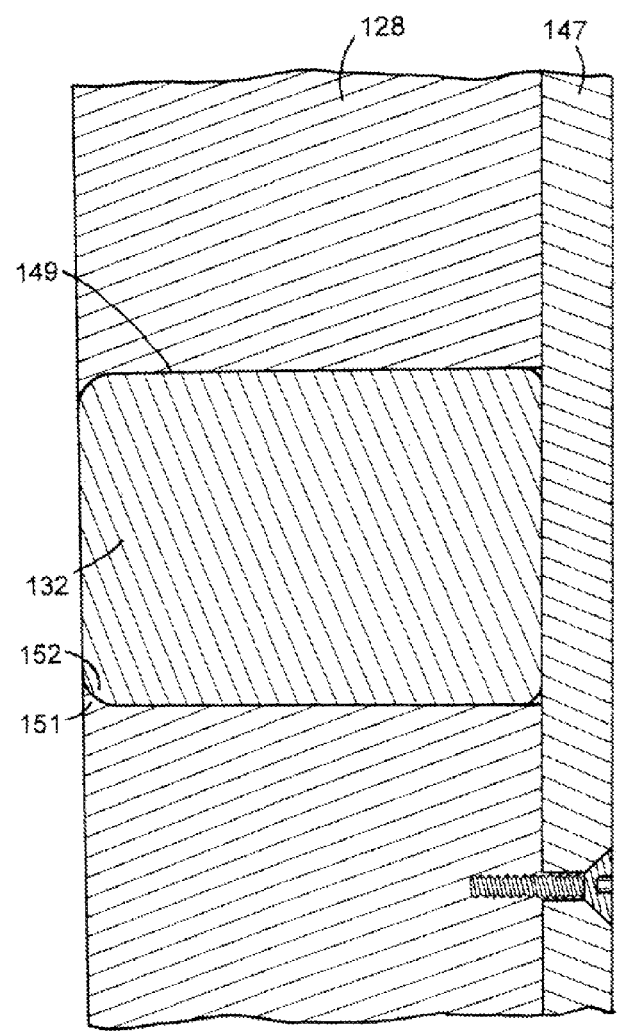
FIG. 11 is an enlarged sectional view taken along line 11-11 of FIG. 8.

A second embodiment of second disk assembly 127 shown in FIGS. 7 to 11 comprises a cylindrical body 128 of non-magnetic material, such as aluminum, plastic or ceramic having a hub 129 with a center bore 130 for accommodating transmission input drive shaft 28. Bore 130 can have axial splines or other structures to drivably mount body 128 on shaft 28 and allow body 128 and hub 129 to axially move on shaft 28. Body 128 has two rings of cylindrical bores accommodating an outer first ring of permanent magnets 131-138 and an inner second ring of permanent magnets 139-146. A plate 147 attached with fasteners 148 to the back surface of body 129 covers the outer ends of magnets 131-146. Each magnet 131-146 has a cylindrical body located in firm surface engagement with the inside cylindrical walls of the bores in body 128. As shown in FIG. 11 body 128 has a cylindrical wall 149 with magnet 132 positioned in surface contact with wall 149. Body 128 has an inwardly directed annular lip 151. Magnet 132 has an annular rounded end section 152 engageable with lip 151 to retain magnet 132 in assembled relation with body 128. Plate 147 also holds magnet 132 within the bore in body 128.

Figure 12:
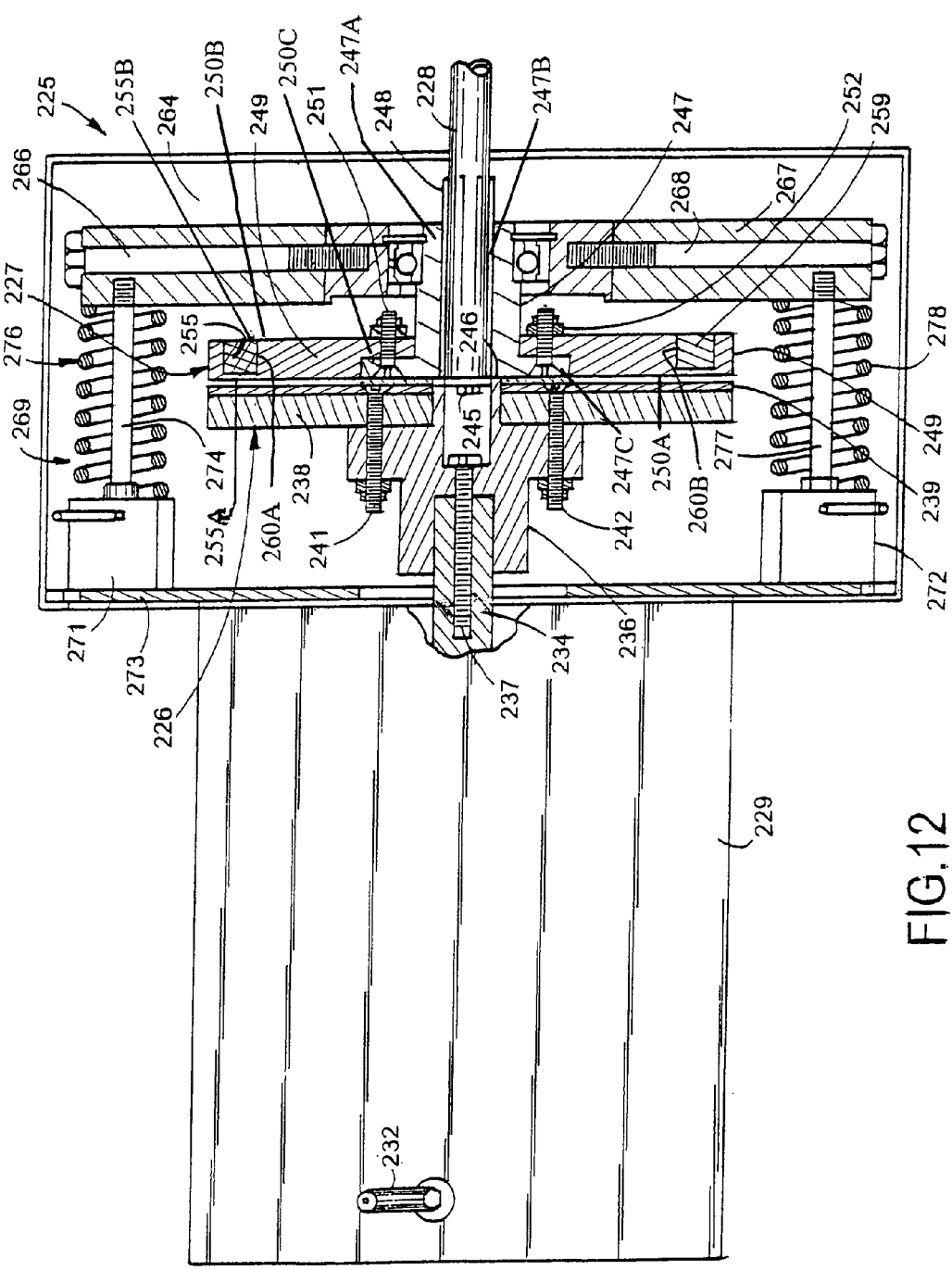
FIG. 12 is a view similar to FIG. 3 showing an alternative embodiment of the magnet power transmission connected to an electric motor.

Another embodiment of the magnet power transmission 225, shown in FIG. 12, has a first disk assembly 226 and a second disk assembly 227. The parts of magnet power transmission 225 that correspond with the parts of magnet power transmission 25, shown in FIGS. 3 and 4, have the same reference numbers with the prefix 2 and are incorporated in magnet power transmission 225. First disk assembly 226 includes a ferrous metal annular body 238 secured to a hub 236. Hub 236 is mounted on motor drive shaft 234 whereby electric motor 229 rotates first disk assembly 226. Body 238 has an inner flat face in surface contact with a flat copper plate 239.

Second disk assembly 227 shown in FIG. 12 includes an annular body 249 of non-magnetic material, such as aluminum, plastic or ceramic having a first flat side wall 250A and a second flat side wall 250B. Body 249 has blind holes 260A and 260B located in a circular pattern around an outer annular portion of body 249. Permanent magnets 255 and 259 are disposed within the blind holes 260A and 260B. The surface of side wall 250A of body 249 is flat and continuous. Magnet 255 has a first end 255A located in surface contact with the body adjacent first side wall 250A and a second end 255B aligned with second side wall 250B whereby the entire magnet 255 is located within bore 260A. Magnet 259 located within bore 260B has the same structure as magnet 255. A hub 247 is secured to body 249 with fasteners 251 and 252. Hub 247 has an axial sleeve 247A having a bore 247B accommodating shaft 228. Sleeve 247A is joined to a radial flange 247C. The inner portion of body 249 has an annular recess 250C accommodating flange 247C. Fasteners 251 and 252 secure flange 247C to body 249. The minimum space between disk assemblies 226 and 227 is maintained with a stop member or washer 246 connected to the inner end of shaft 228 with a bolt 245. Other types of structures can be used to maintain a space relationship between copper plate 239 and the inside face of body 249. Stop member 246 allows limited radial shifting of disk assembly 226 relative to disk assembly 227. Vibrations and forces are not transmitted between disk assemblies 226 and 227. Hydraulic units 271 and 272 operate to move disk assembly 227 toward disk assembly 226 to vary the magnet drive between disk assemblies 226 and 227 and the rotating speed of shaft 228. Springs 276 and 278 bias disk assembly 227 away from disk assembly 226 to reduce the magnet drive between disk assemblies 226 and 227 whereby reducing the rotating speed of shaft 228.

Figure 13:
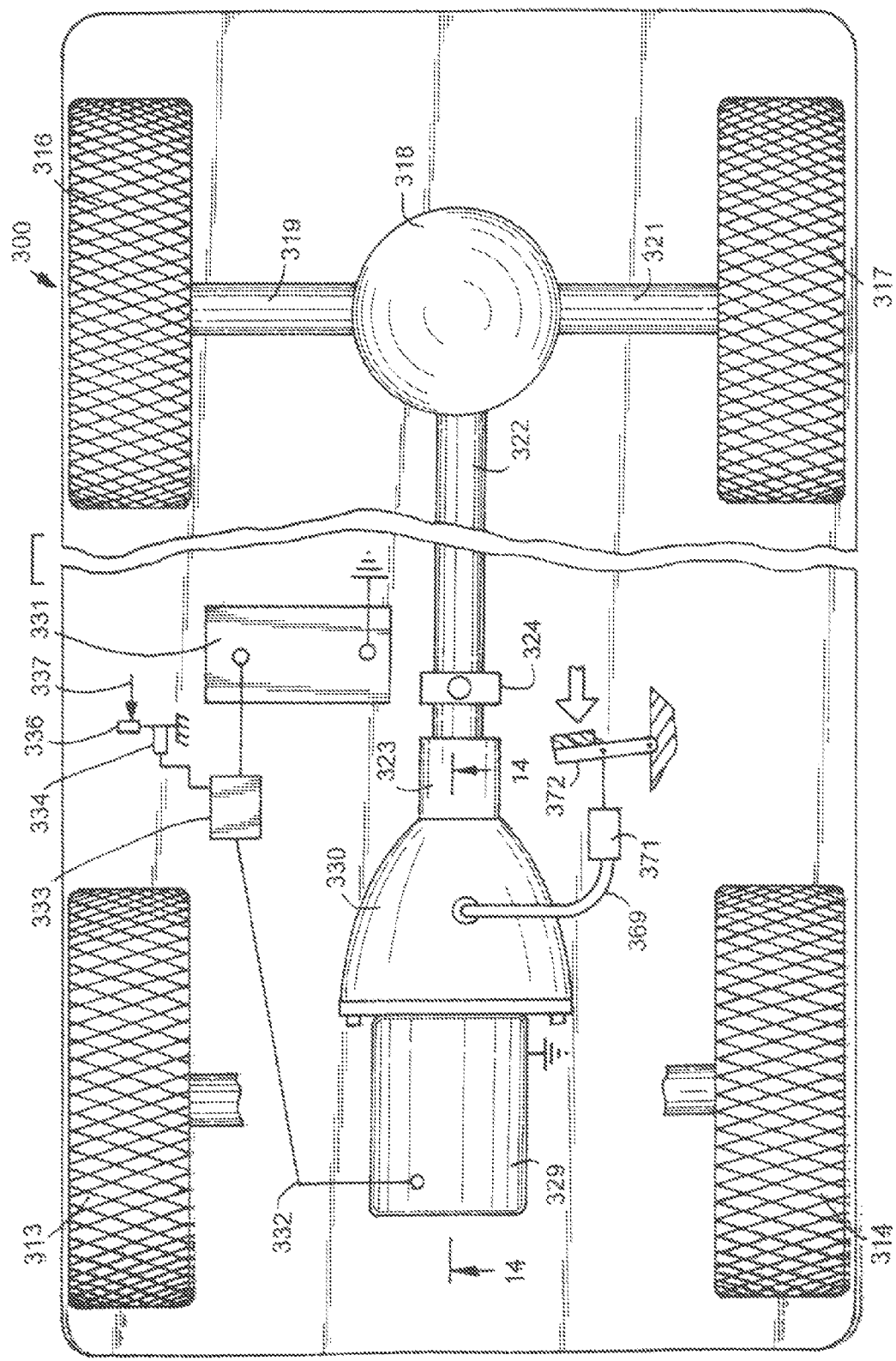
FIG. 13 is foreshortened diagram of a motor vehicle having a magnet power transmission connected to an electric motor.

A diagram of the drive assembly of motor vehicle 300, shown in FIG. 13, includes front wheels 313 and 314 and drive rear wheels 316 and 317. A differential 318 connected to rear axles 319 and 321 transmit power from drive shaft 322 to rear wheels 316 and 317. A universal joint 324 connects drive shaft 322 to a transmission 323. Transmission is a gear box, such as a five-speed manual transmission with overdrive or an automatic transmission with overdrive.

Motor vehicle 300 is powered with an electric motor 329, such as a direct current 100 horsepower electric motor. Other types and horsepower electric motors can be used to power motor vehicle 329. Motor 329 is connected to a housing 330. Motor 329 and housing 330 are mounted on the frame of motor vehicle 300. Electric power is supplied to motor 329 with a power supply or one or more batteries 331. An electric conductor or cable 332 connects batteries 331 with motor 329. A controller 333 interposed in cable 332 is operable to regulate the operating speed of motor 329. A manual adjustable device 334, such as a potentiometer, operatively connected to a foot pedal 336 provides signals to regulate the operation of controller 333 to control the operating speed of motor 329. Foot pedal 336 is manual moved as shown by arrow 337 by the motor vehicle's operator. An automatic speed control system (not shown) can also be operatively associated with controller 333.

Figure 14:
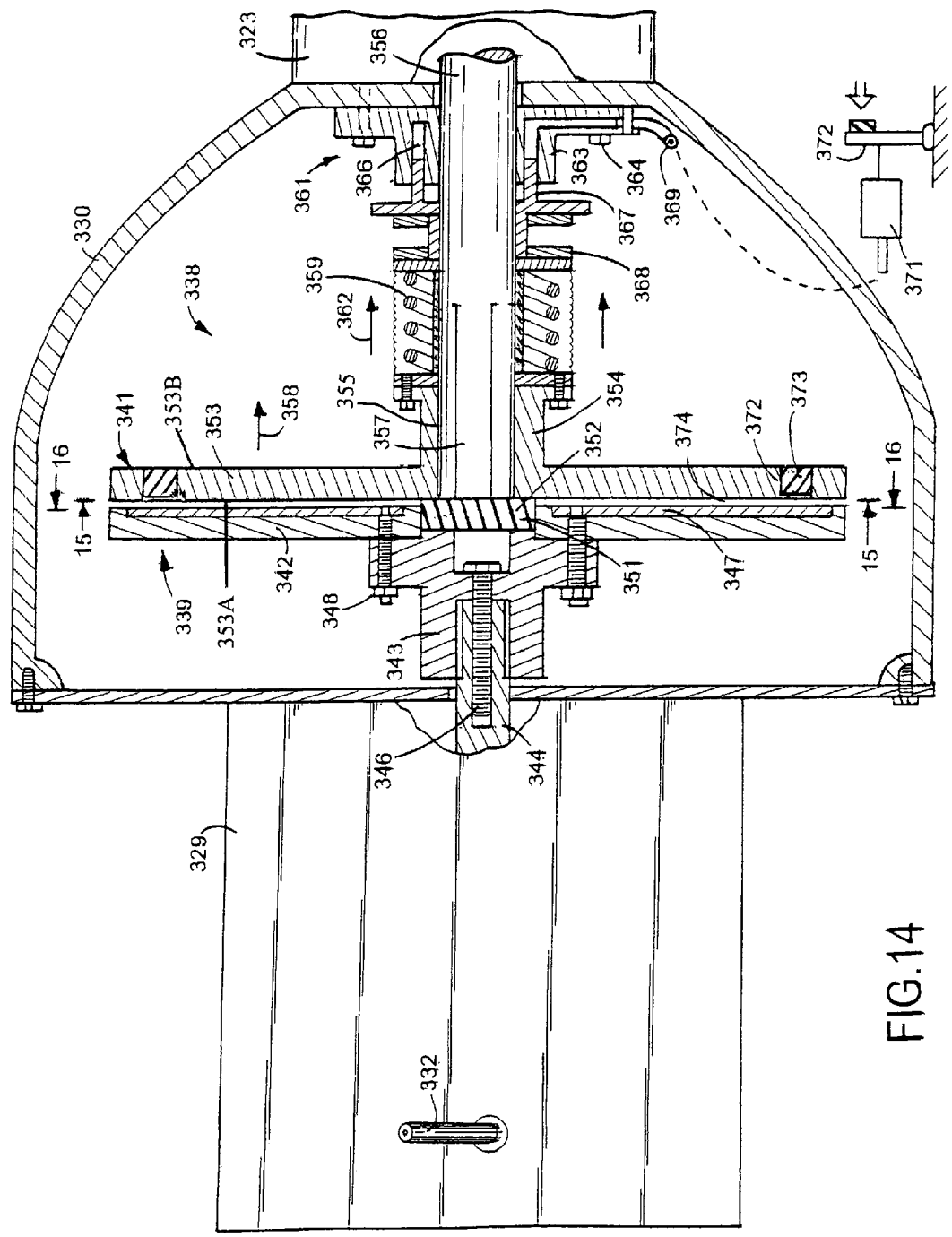
FIG. 14 is an enlarged sectional view taken along line 14-14 of FIG. 13.
Figure 16:
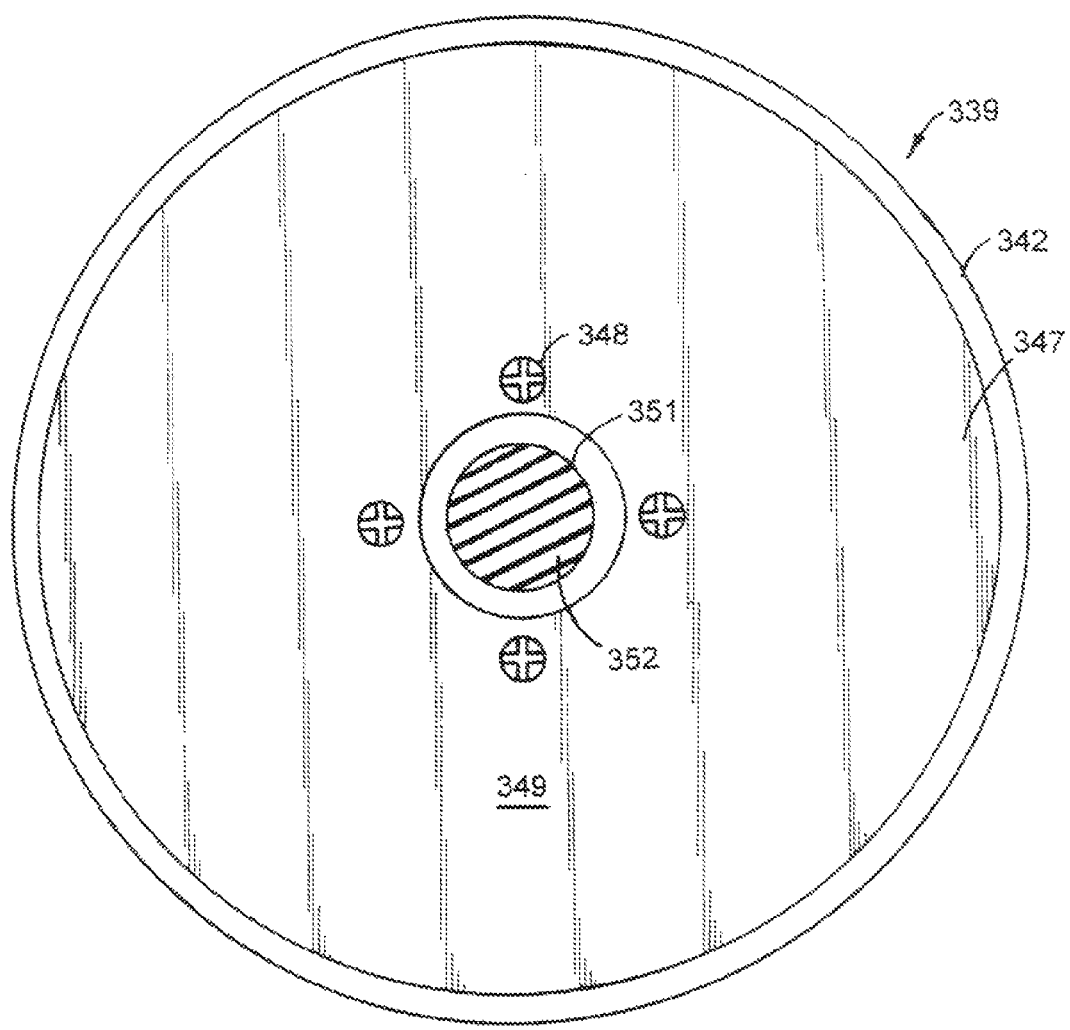
FIG. 16 is a sectional view taken along the line 16-16 of FIG. 14.

A magnet power transmission 338 located within housing 330, shown in FIG. 14, has a first disk assembly 339 and a second disk assembly 341. A magnet flux force transmits rotational force from disk assembly 339 to disk assembly 341. Disk assembly 339 has a circular body 342 of magnetic material, such as steel, attached to a hub 343. Hub 343 is mounted on a drive shaft 344 of motor 329. A bolt 346 retains hub 343 on the ends of drive shaft 344. A flat copper plate 347 located on the flat inside surface of body 342 is retained thereon with fasteners 348. As shown in FIG. 16, copper plate 347 is a circular member having a flat annular outer face 349. Body 342 has a center opening 351 accommodating a spacer or stop member 352 operable to prevent contact between disk assemblies 339 and 341. Stop member 352 is an ultra high density polyethylene member engageable with hub 343 and disk assembly 341. Other structures including a thrust bearing can be used to maintain the space relationship between disk assemblies 339 and 341.

Figure 15:
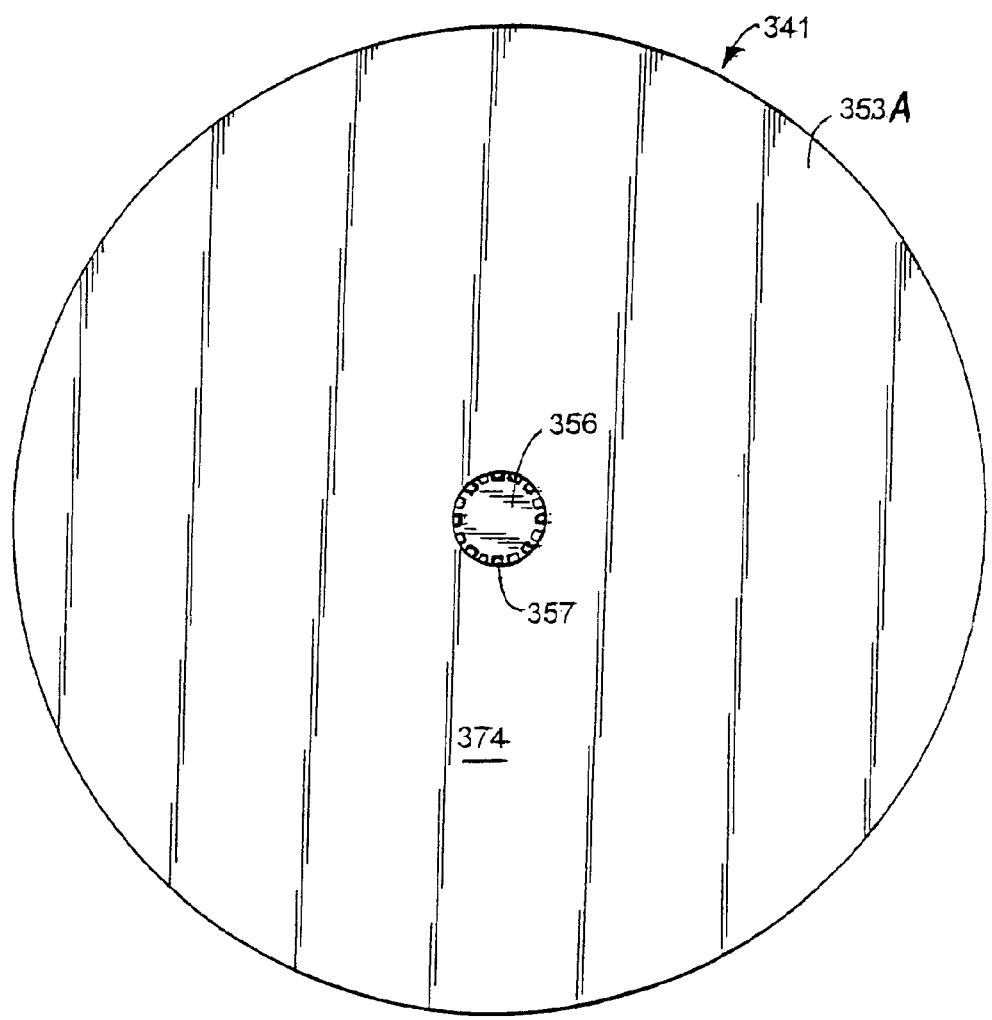
FIG. 15 is a sectional view taken along the line 15-15 of FIG. 14.

Disk assembly 341 comprises a generally flat circular body 353 of non-magnetic material, such as aluminum or ceramics, joined to a hub 354. The hub can be a separate member attached to body 353. Hub 354 is mounted on an end portion of a power output shaft 356 operatively connected to transmission 323. A plurality of cooperating splines 357 on hub and shaft 356 allow disk assembly 341 to move laterally, shown by arrow 358, by action of spring 359 and piston and cylinder assembly 361. Spring 359 biases disk assembly 341 away from disk assembly 339, shown by arrows 362 to release the magnetic flux drive force between disk assemblies 339 and 341. Piston and cylinder assembly 361 has annular cylinder member 363 mounted with bolts 364 on housing 330. Member 363 has an annular chamber 366 accommodating an annular piston 367. A hydraulic fluid line or hose 369 connected to cylinder member 363 and a master cylinder 371 applies hydraulic fluid under pressure to chamber 366. A foot pedal 372 actuates master cylinder 371 to supply hydraulic fluid to cylinder 366 thereby move piston 367 which moves disk assembly 341 toward disk assembly 339. Disk assembly body 353 has a flat first side wall 353A and a second side wall 353B opposite side wall 353A. Body 353 has a number of circumferentially spaced blind bores 372 accommodating permanent magnets 373. Blind bores 372 have ends open to second side wall 353B of body 353. The magnets 373 are arranged in a circle with adjacent magnets having opposite polarity. The circular arrangement of the magnets is shown in FIG. 6, incorporated herein by reference. As shown in FIGS. 14 and 15, the first side wall 353A of body 353 of disk assembly 341 has a flat continuous surface 374 facing copper plate 347 that spaces magnets 373 from copper plate 347. The magnets 373 are cylindrical neodymium permanent magnets having cylindrical outer walls located in firm surface engagement with the inside cylindrical walls of bores 372 of body 353. Other types of permanent magnets can be mounted on body 353. Body 353 is joined to a cylindrical hub 354. Body 353 and hub 354 is a one-piece member. Hub 354 has an axial bore 355 accommodating a shaft 356.

Figure 17:
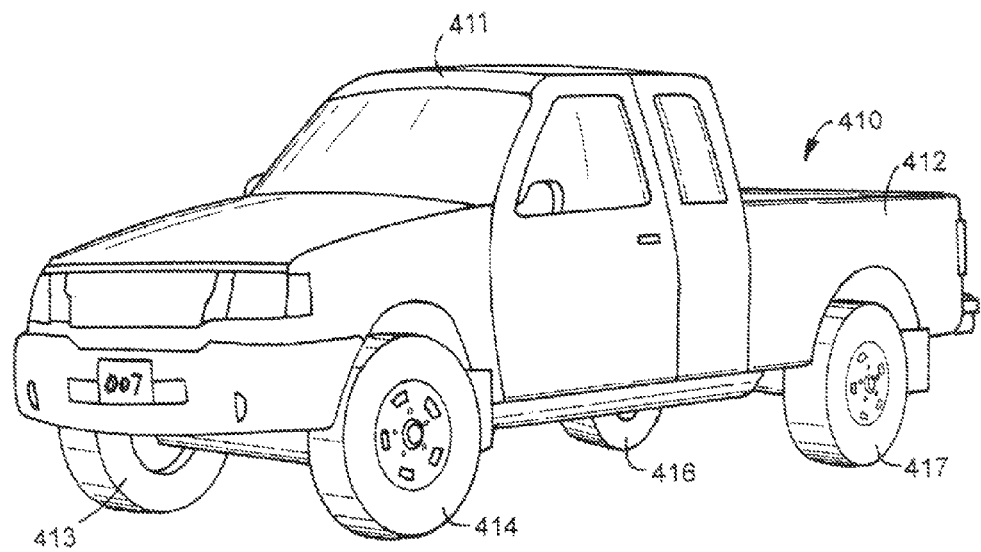
FIG. 17 is a perspective view of a motor vehicle having a further embodiment of a magnet power transmission connected to an electric motor.
Figure 18:
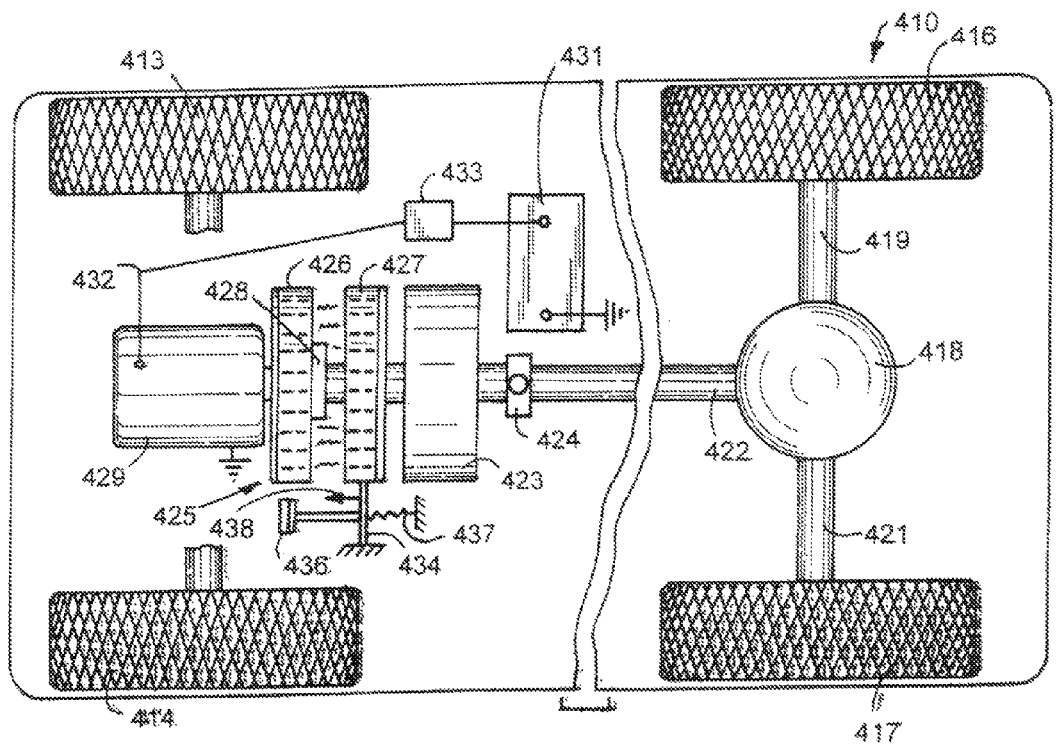
FIG. 18 is a foreshortened diagram of the motor vehicle of FIG. 17.

The electric power system having a magnet power transmission of the invention is incorporated into a motor vehicle 410, shown in FIGS. 17 and 18 as a pickup truck. An example of the truck is a Ford Ranger® manufactured by the Ford Motor Company in St. Paul, Minn. Other types of pickup trucks, automobiles, motor homes and motor vehicles can be equipped with the electric power system of the invention. Motor vehicle 410 has an extended cab 411 for accommodating the vehicle operator and passengers. A box 412 for cargo is located behind the cab. Front wheels 413 and 414 and rear drive wheels 416 and 417 support vehicle 410 on a surface of a road. As shown in FIG. 18, rear wheels 416 and 417 are drivably connected to a differential 418 with axles 419 and 429. A drive shaft 422 is coupled to a five-speed manual transmission with overdrive 423. A universal joint 424 connects drive shaft 422 with transmission 423. The transmission 423 can be an automatic transmission with overdrive.

Figure 19:
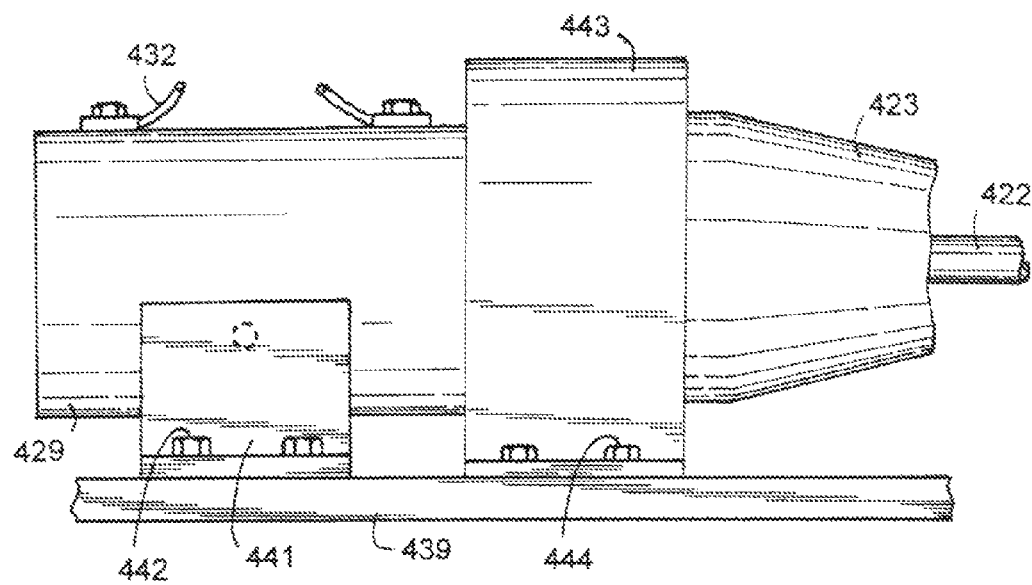
FIG. 19 is a side elevational view of the combined magnet power transmission and electric motor of FIG. 17.
Figure 20:
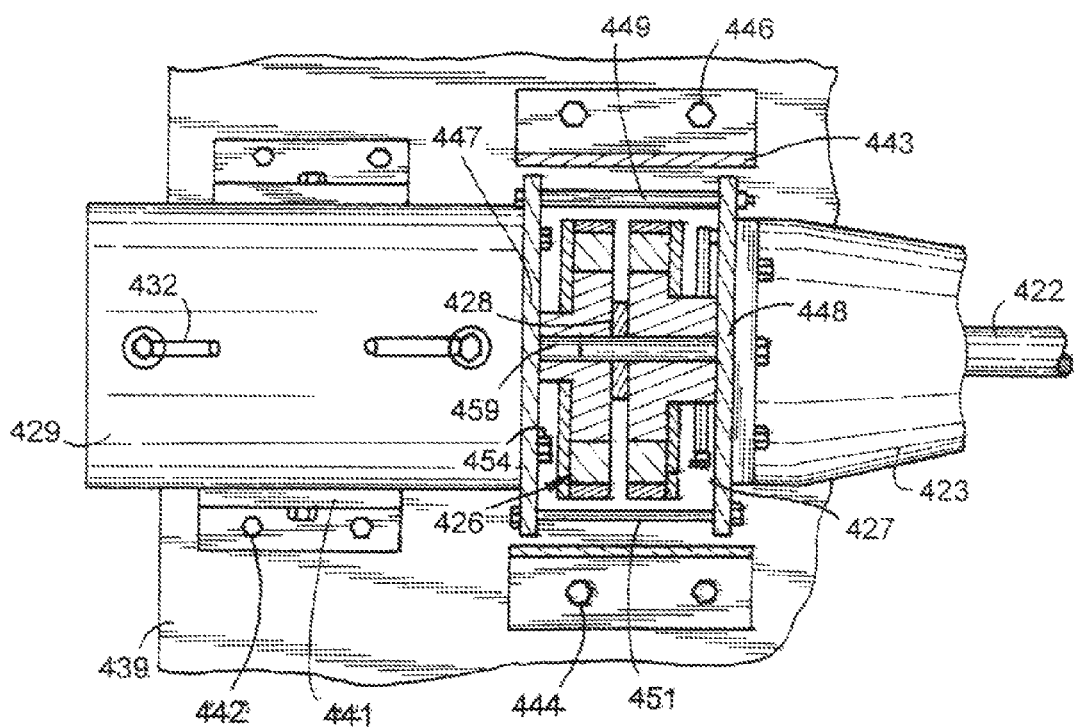
FIG. 20 is a top plan view, partly sectioned, of the combined magnet power transmission and electric motor of FIG. 19.

The magnet power transmission 425 has a first disk assembly 426 located adjacent a second disk assembly 427. A spacer, washer or thrust bearing 428 maintains a lateral space relation between disk assemblies 426 and 427 whereby a magnetic flux force transmits torque from disk assembly 426 to disk assembly 427. Disk assembly 427 is laterally moved away from disk assembly 426 to reduce and terminate the transfer of torque from disk assembly 426 to disk assembly 427. Disk assembly 426 is moderated on the drive shaft 459 of an electric motor 429. An electric power supply or battery 431 provides electric power to operate electric motor 429. Motor 429 is a d.c. electric motor having 100 or more horsepower. An electric cable 432 wires battery 431 to motor 429. A controller 433 in communication with cable 432 regulates the speed of operation of motor 429. Controller 433 can be manually controlled or regulated with an automatic speed control electronics. As shown in FIGS. 19 and 20, electric motor 429 is supported on vehicle frame 439 with a pair of brackets 441. Fasteners 442 secure bracelets 441 to frame 439. A housing 443 located over disk assemblies 426 and 427 is secured with fasteners 446 to frame 439. As shown in FIG. 20, a pair of plates 447 and 448 connected with horizontal rods 449 and 451 connect electric motor 429 to transmission 423.

Figure 21:
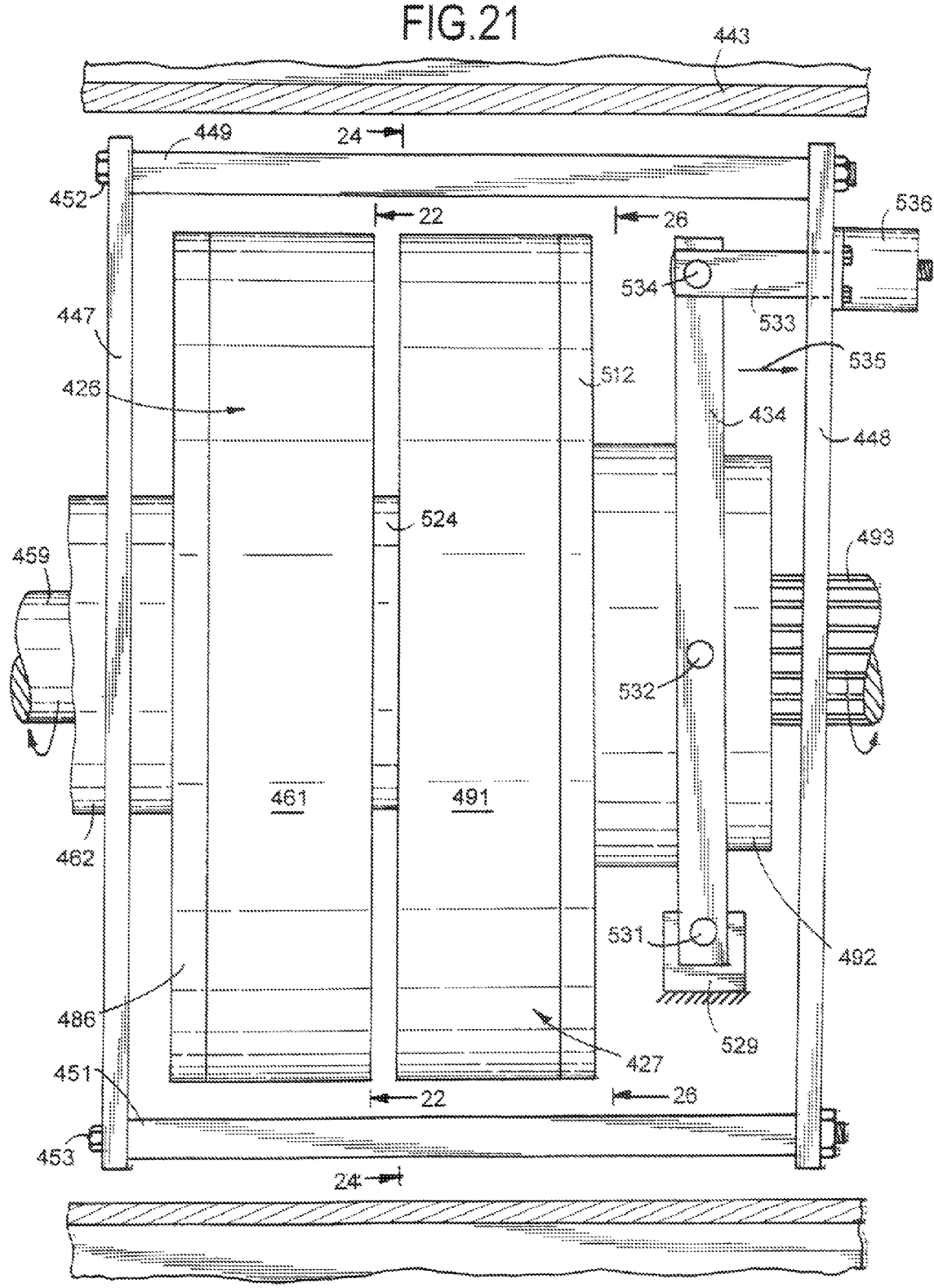
FIG. 21 is an enlarged side elevational view of the magnet power transmission of FIG. 20.
Figure 22:
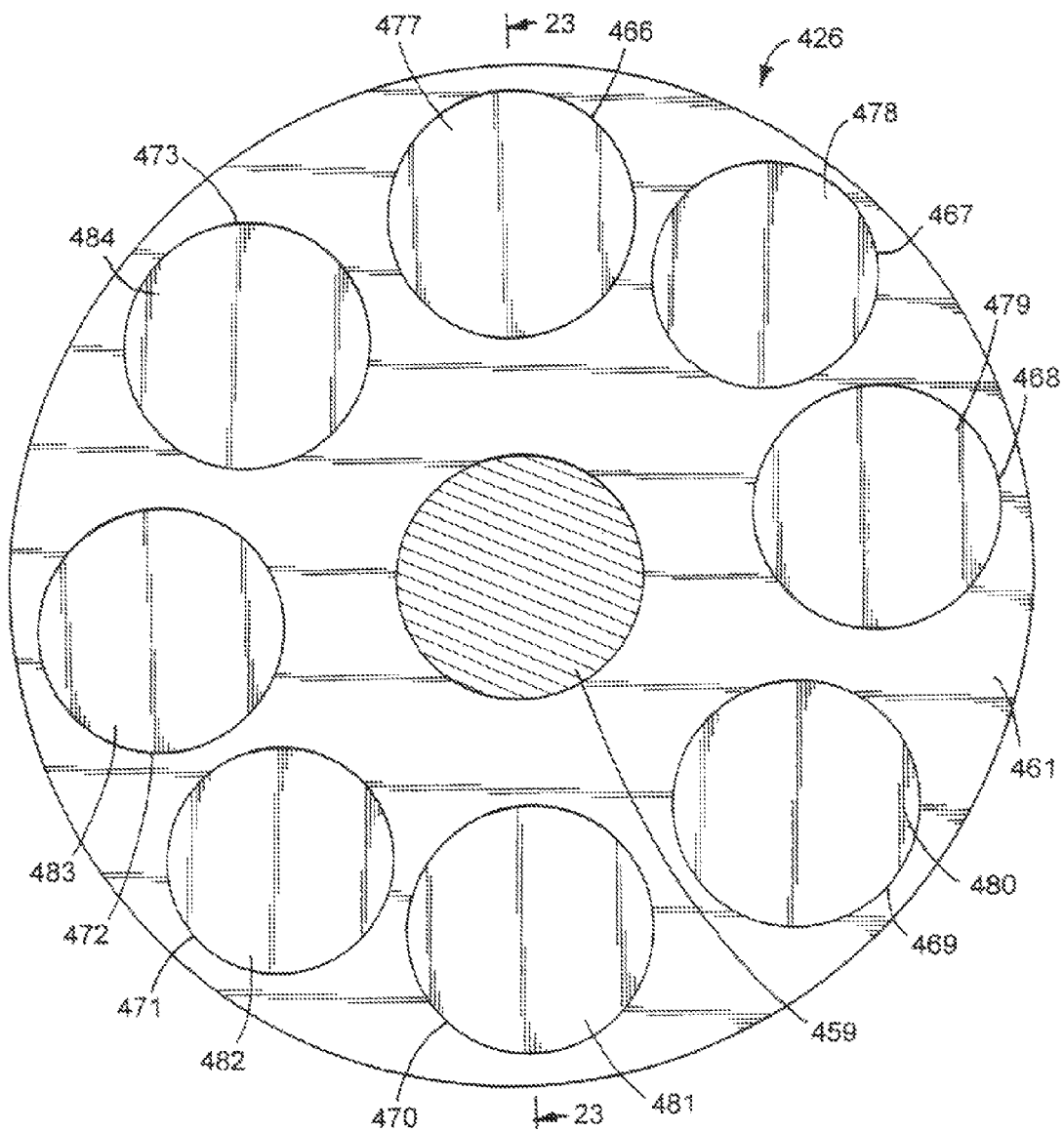
FIG. 22 is a sectional view taken along line 22-22 of FIG. 21.
Figure 23:
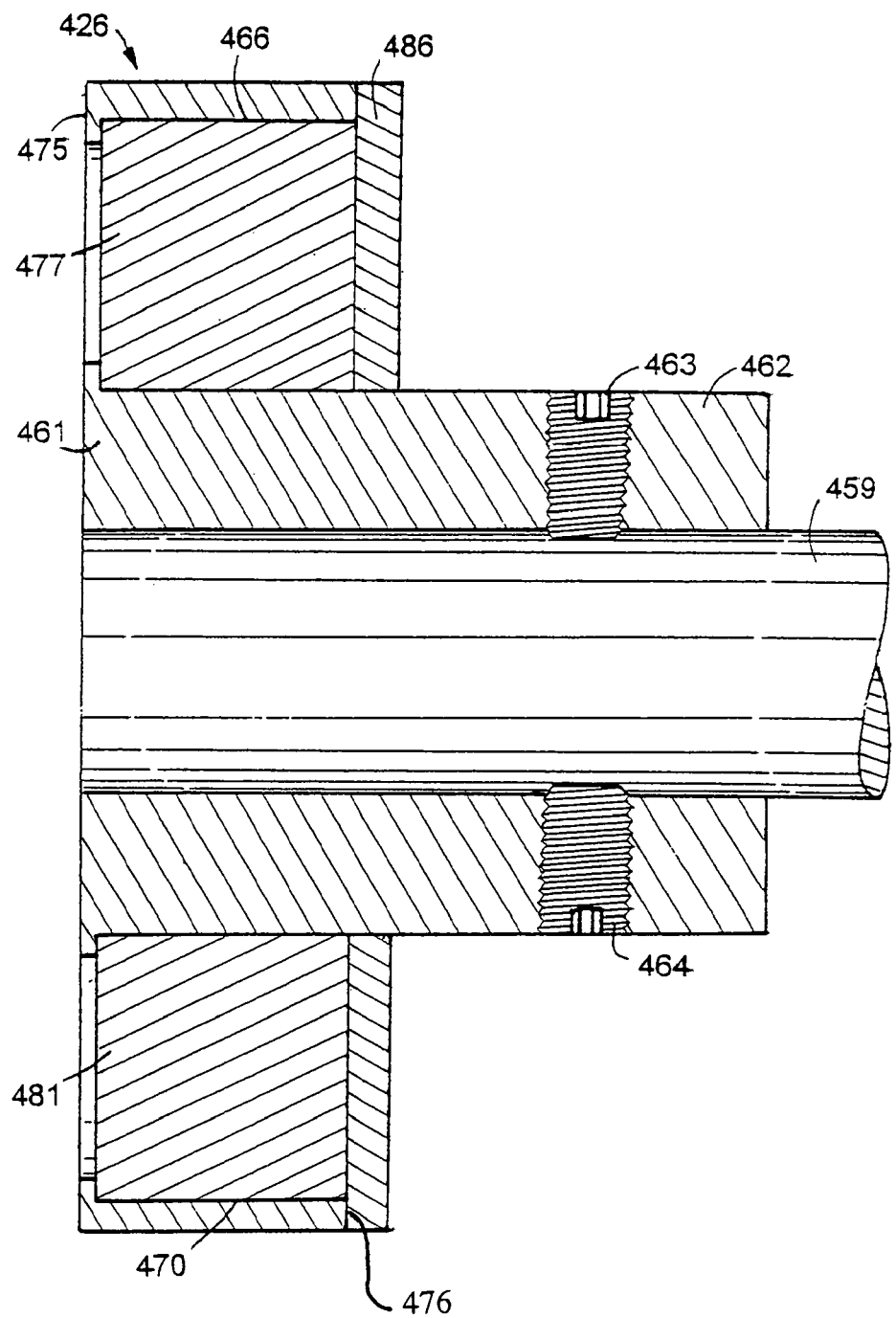
FIG. 23 is a sectional view taken along line 23-23 of FIG. 22.

First disk assembly 426, shown in FIGS. 21, 22 and 23, comprises a cylindrical body 461 joined to a hub 463 fixed to the motor drive shaft 459. A pair of fasteners 463 and 464, shown as set screws, lock hub 462 on shaft 459. Hub 462 and shaft 459 can have cooperating splines (not shown) to drivably connect shaft 459 to hub 462 and body 461. As shown in FIGS. 22 and 23, body 461 has a first side wall 475 and a second side wall 476. Body 461 also has a plurality of cylindrical bores 466-473 open to side wall 476 accommodating cylindrical permanent magnets 477-484. The magnets 477-484 are in a circular arrangement parallel to the axis of rotation of shaft 459. Eight circumferentially spaced magnets 477-484 are shown in FIG. 22. The number and size of the magnets as well as the diameter of body 461 can vary. Magnets 477-484 are rare earth permanent magnets, such as neodymium magnets. Other types of permanent magnets can be retained on body 461 to provide a flux field that drivably couples disk assembly 426 with disk assembly 427. As shown in FIGS. 21 and 23, an annular flat ring 486 of non-magnetic material surrounds hub 462 and engages the outside radial side wall 476 of body 461. Ring 486 covers the outside faces of magnets 477-484. Fasteners, such as bolts (not shown) secure ring 486 to body 461. First disk assembly 426 need not include ring 486 as magnets 477-484 are located in a relative snug or tight fit in bores 466-473.

Figure 24:
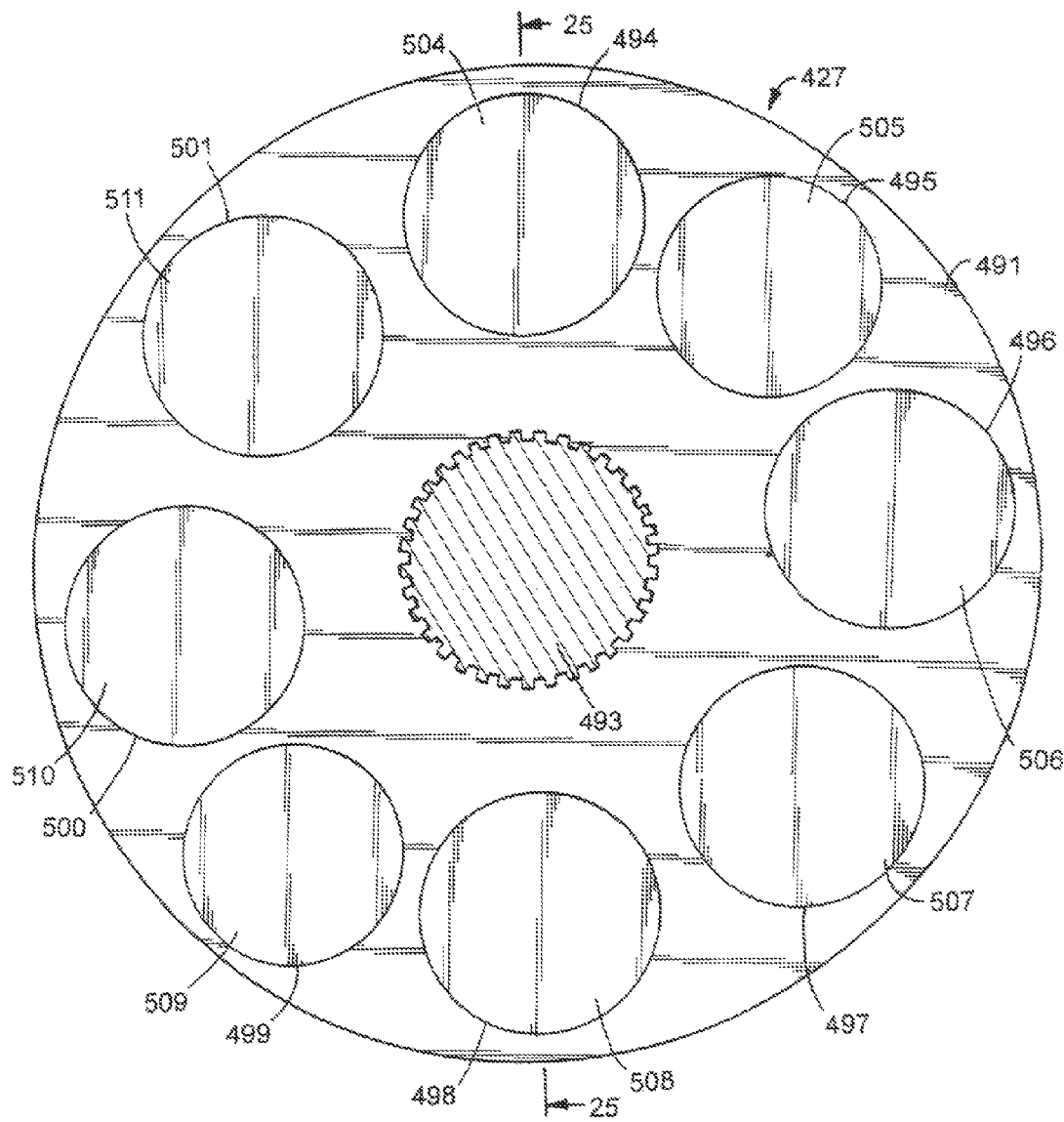
FIG. 24 is a sectional view taken along line 24-24 of FIG. 21.
Figure 25:
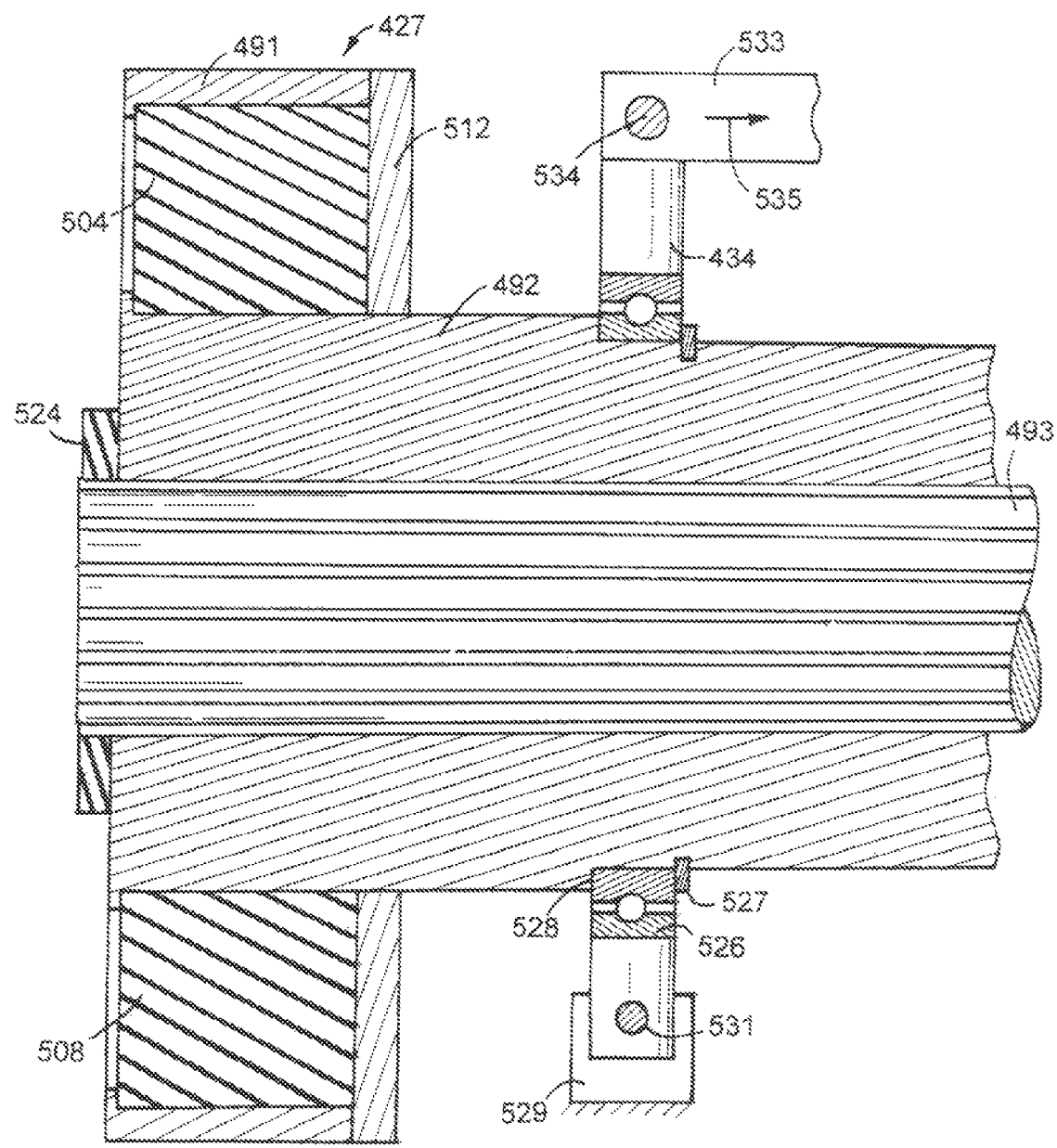
FIG. 25 is a sectional view taken along line 25-25 of FIG. 24.
Figure 26:
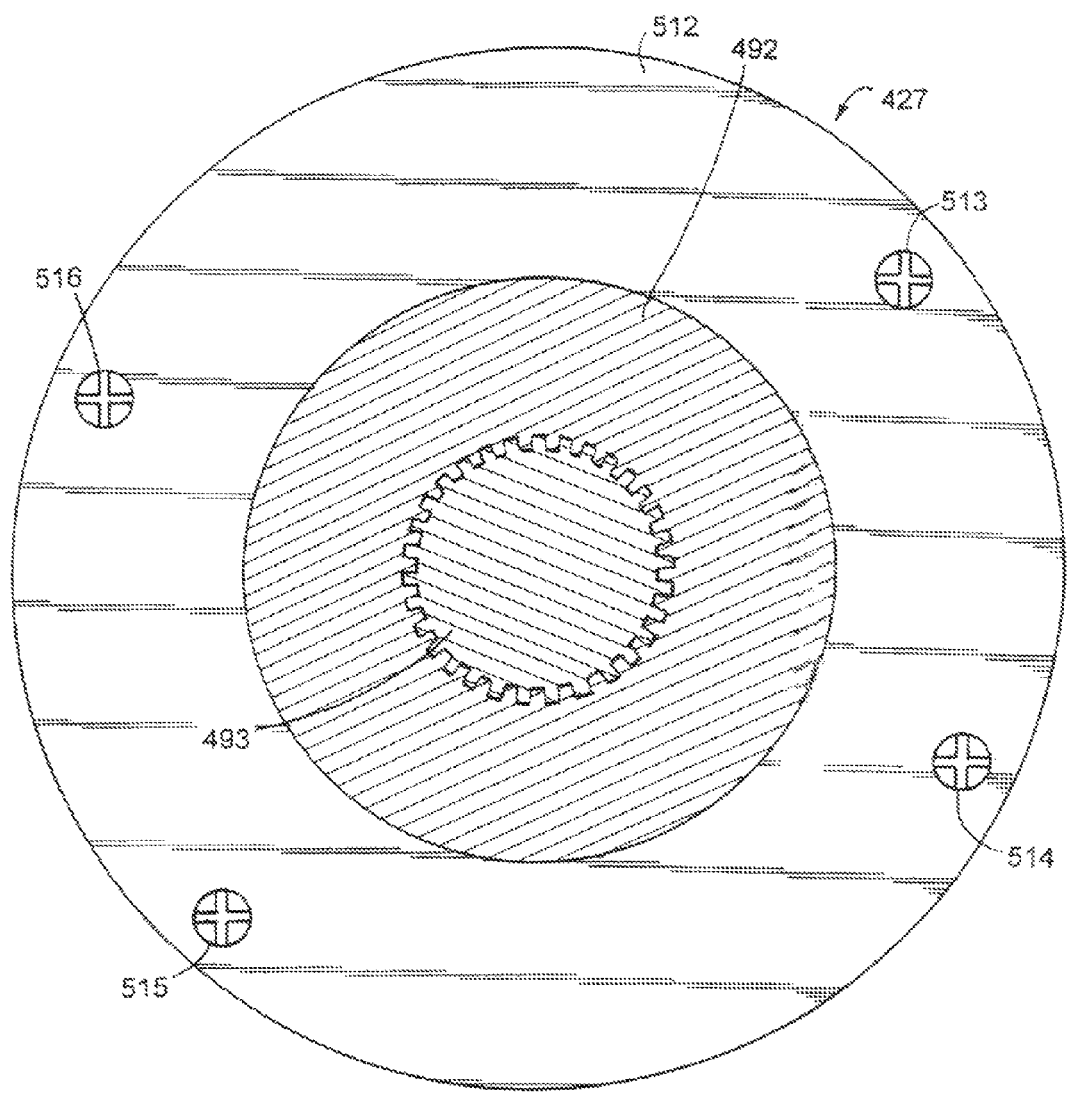
FIG. 26 is a sectional view taken along the line 26-26 of FIG. 21.

Second disk assembly 427, shown in FIGS. 21, 24 and 25, has a cylindrical body 491. Body 491 is a non-magnetic member having a plurality of bores 494-501 accommodating cylindrical permanent magnets 504-511. Magnets 504-511 have a polarity opposite the polarity of magnets 477-484. Body 491 is joined to a hub 492. Body 491 and hub 492 have a center bore slidable accommodating a power output shaft 493 connected to the transmission of the vehicle. Shaft 493, hub 492 and body 491 have cooperating splines that drivably couple body 491 and hub 492 to shaft 493 and allow axial movement of body 491 and hub 492 along the length of shaft 493. As shown in FIGS. 25 and 26, a flat ring or annular plate 512 of non-magnetic material surrounds hub 492. A plurality of fasteners 513-516 secures ring 512 to the outside face of hub 491 covering the outside ends of magnets 504-511.

A hydraulic piston and cylinder assembly 536 responsive to fluid under pressure from a master cylinder actuated with a foot pedal, as shown in FIG. 13 incorporated herein by reference, operates a lever mechanism to selectively move second disk assembly 427 toward and away from first disk assembly 426 thereby changing the spacing between disk assemblies 426 and 427. A maximum flux force between disk assemblies is achieved with a close space between disk assemblies 426 and 427. When disk assembly 427 is moved away from disk assembly 426, the flux force is reduced thereby reducing the torque transfer from disk assembly 426 to disk assembly 427. Lever mechanism comprises a yoke 434 pivoted with pivot members or pins 532 to opposite sides of a thrust bearing 526. As shown in FIG. 25, a snap ring 527 retains bearing 526 in contact with an annular shoulder 528 on hub 492. Yoke 434 has a lower end pivoted with a pivot member 531 to a support 529. The opposite or upper end of yoke is pivoted with a pivot member 534 to a link 533 connected to hydraulic piston and cylinder assembly 536. When yoke 434 is moved in a clockwise direction, shown by arrow 535, first disk assembly 427 slides along shaft 493 away from disk assembly 426. Movement of yoke 434 in a counterclockwise direction moves disk assembly 427 toward disk assembly 426 to increase the power transfer or torque from disk assembly 426 to disk assembly 427. This torque transfer is achieved by the flux force between magnets 477-484 and magnets 504-511.

Figure 27:
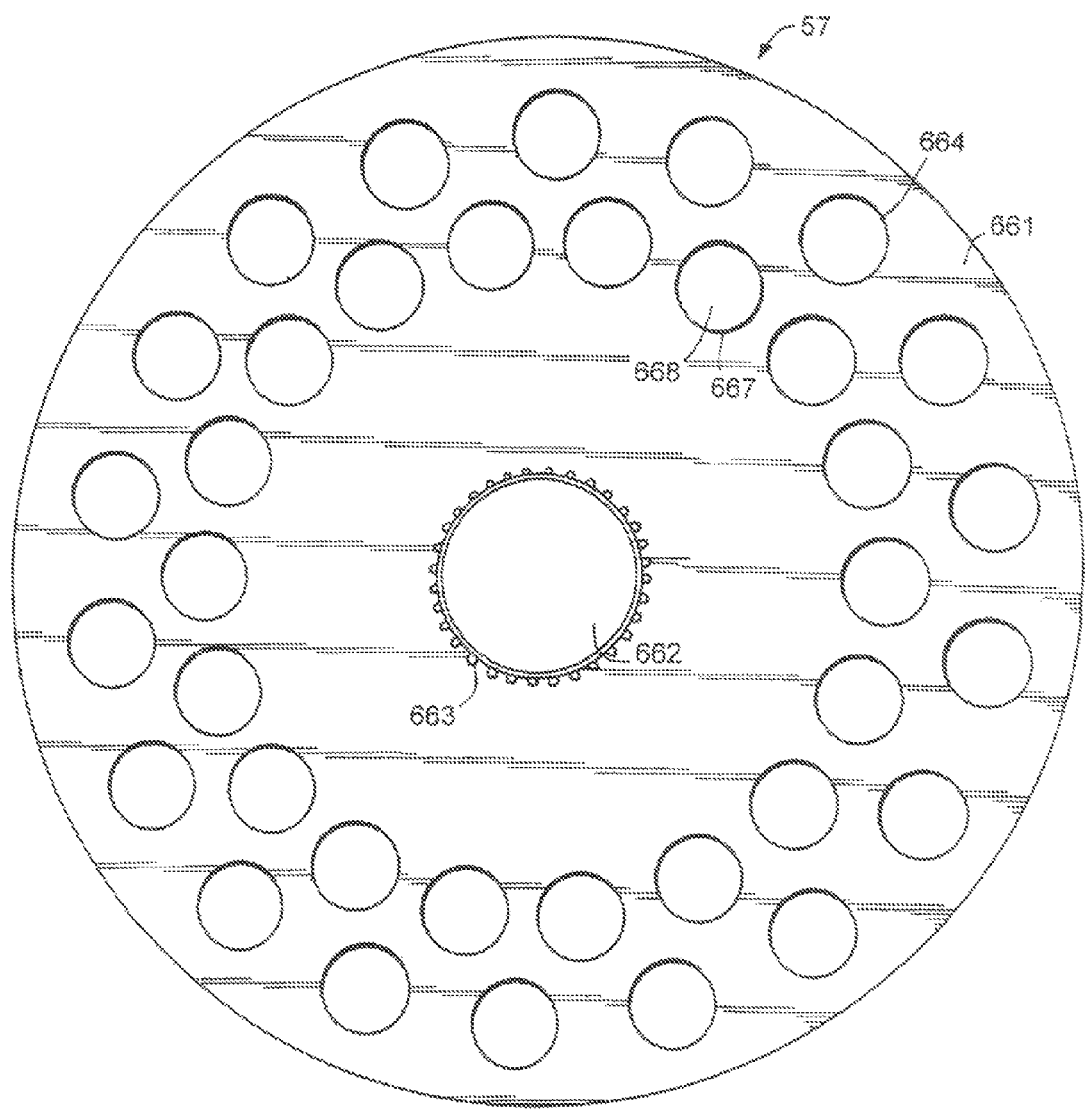
FIG. 27 is a modification of a disk assembly with two circular rows of permanent magnets.

A modification of the disk assembly 657, shown in FIG. 27 has a non-magnetic body 661. Body 661 has a center opening 662 surrounded with a cylindrical wall with splines 663 adopted to slidably locate disk assembly 657 on power output shaft 493. The disk assembly 657 can also be mounted on motor drive shaft 459. Body 661 has a circular arrangement of first bores 664. The first bores shown in FIG. 27 has 18 cylindrical bores with cylindrical permanent magnets 666. Located radially inward from the first row of magnets 666 is a second circularly arranged second bores 667 accommodating cylindrical magnets 668. The number of bores 664 and 667 can be changed along with the number and size of the magnets.

There have been shown and described several embodiments of a motor vehicle having an electric motor with a magnet power transmission. Changes in materials, structures, arrangement of structure and magnets can be made by persons skilled in the art without departing from the invention.

The invention claimed is:

1. A magnet disk assembly comprising:
a cylindrical body of non-magnetic material having a substantially flat first side wall,
a second side wall opposite the first wall, and
an annular recess,
a plurality of circumferentially spaced blind bores located in said body, each of said bores having a first end open to said first side wall, and a second end located adjacent a portion of the second side wall of the body,
a permanent magnet located in each of said bores, said magnet having a first end and a second end opposite the first end,
the first end of the magnet located adjacent said portion of the second side wall of the body, the second end of the magnet located in alignment with the first side wall whereby the entire magnet is located within the bore,
said permanent magnets located in adjacent bores having opposite polarities,
a hub joined to the body,
said hub being laterally extended away from the first side wall of the body,
said hub having a bore for accommodating a shaft,
the hub includes an annular flange,
said annular flange being located in the annular recess in the body, and
fasteners connecting the flange to the body.

2. The magnet disk assembly of claim 1 wherein:
the body is an aluminum body.

3. The magnet disk assembly of claim 1 wherein:
each bore is a cylindrical bore, and
each permanent magnet is a cylindrical permanent magnet located in a cylindrical bore.

4. The magnet disk assembly of claim 1 including:
a member located adjacent the first side wall of the body and covering the open end of each of the bores.

5. A permanent magnet disk assembly comprising:
a cylindrical body of non-magnetic material having a first side wall and a flat second side wall spaced from the first side wall,
a plurality of spaced bores in said body, each bore open to the first side wall and extended toward the second side wall,
a permanent magnet located between the first and second side walls of the body in each of said bores,
said permanent magnets located in adjacent bores having opposite polarities,
a hub joined to the body,
said hub being laterally extended away from the first side wall of the body,
said hub having a bore accommodating a shaft,
the body has an annular recess,
the hub includes an annular flange,
said annular flange being located in the annular recess in the body, and
fasteners connecting the flange to the body.

6. The magnet disk assembly of claim 5 wherein:
the body is an aluminum body.

7. The magnet disk assembly of claim 5 wherein:
each bore is a cylindrical bore, and
each permanent magnet is a cylindrical permanent magnet located in a cylindrical bore.

8. The magnet disk assembly of claim 5 including:
a member attached to said first side wall of the body and covering each bore open to the first side wall of the body.

9. A permanent magnet disk assembly comprising:
a cylindrical aluminum body having a flat first side wall and a flat second side wall laterally spaced from the first side wall and an annular recess,
a plurality of spaced cylindrical bores in said body, each bore having an open end open to the first side wall and the second side wall,
cylindrical permanent magnets located within said bores,
said cylindrical permanent magnets located in adjacent cylindrical bores having opposite polarities,
said cylindrical permanent magnets having ends aligned with the open ends of the bores whereby each of the permanent magnets are located within a bore,
a cylindrical hub joined to said body,
said hub extended laterally away from the first side wall,
said hub having a bore for supporting the disk assembly on a shaft,
said hub includes an annular flange,
said annular flange being located in the annular recess in the body, and
fasteners connecting the annular flange to the body.

10. The magnet assembly of claim 9 including:
a member attached to said first side wall of the body and covering the open end of each of the bores open the first side wall.

* * * * *